Sept. 22, 1964 K. G. CATLIN 3,150,263
CASSETTE UNLOADING AND RELOADING MACHINE
Filed Dec. 5, 1962 19 Sheets-Sheet 1

INVENTOR.
KENNETH G. CATLIN
BY
ATTORNEY

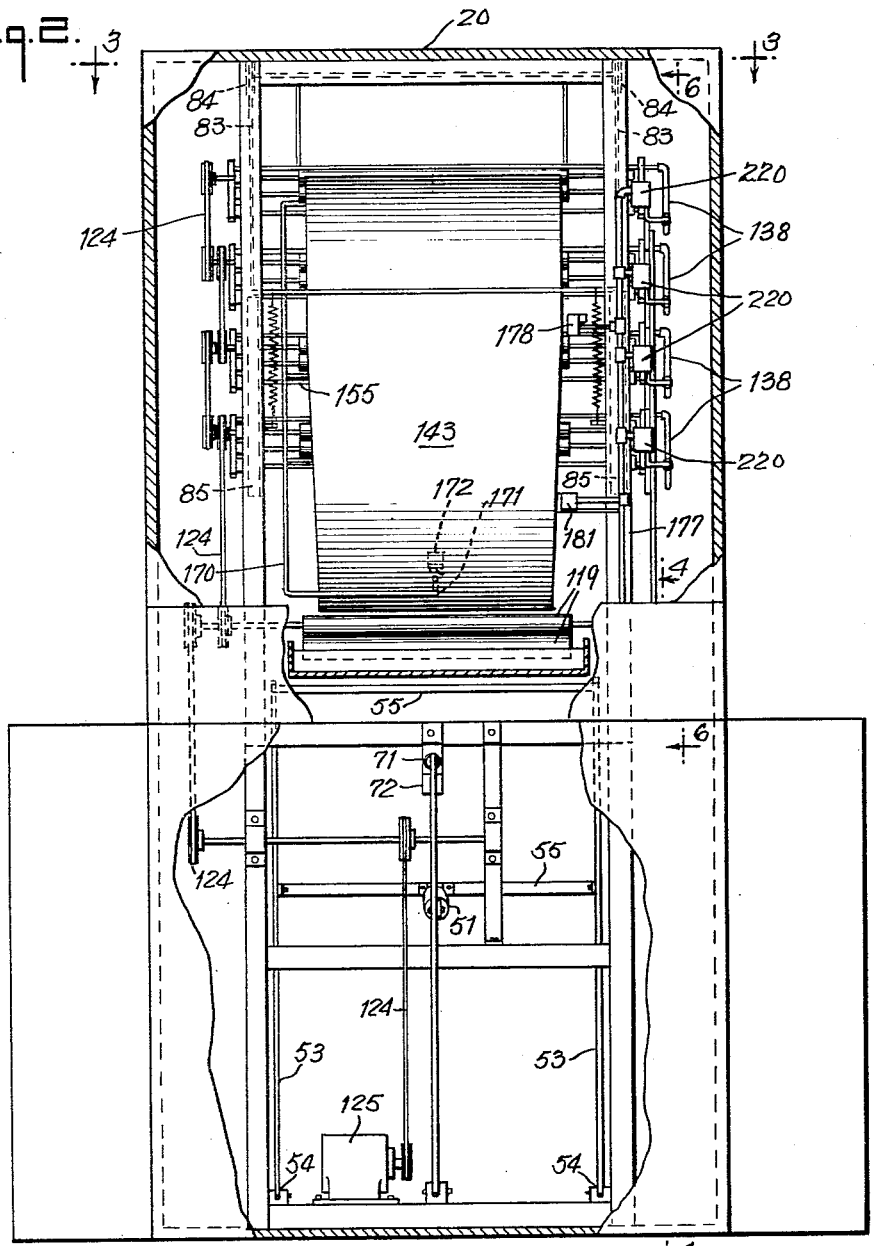

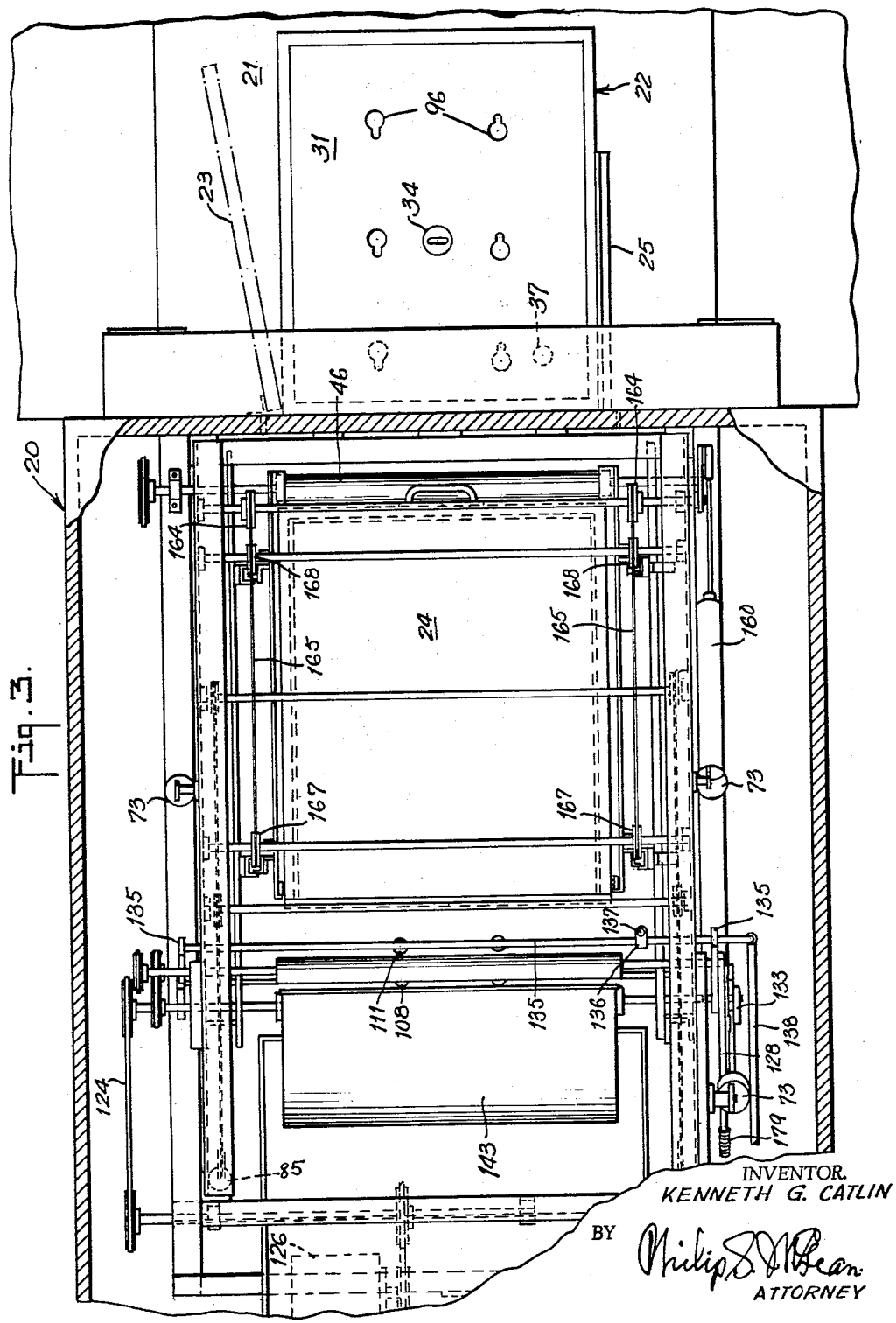

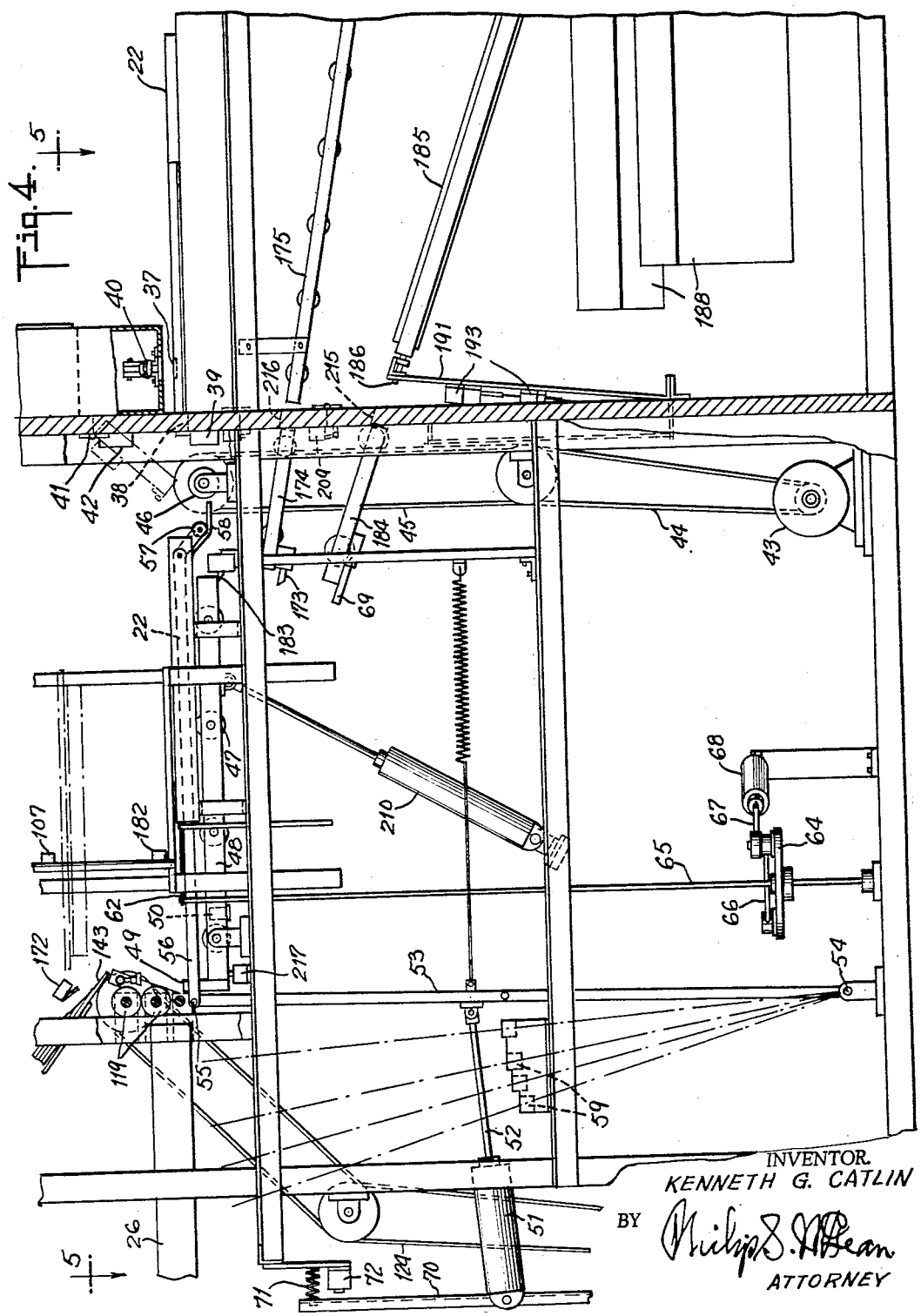

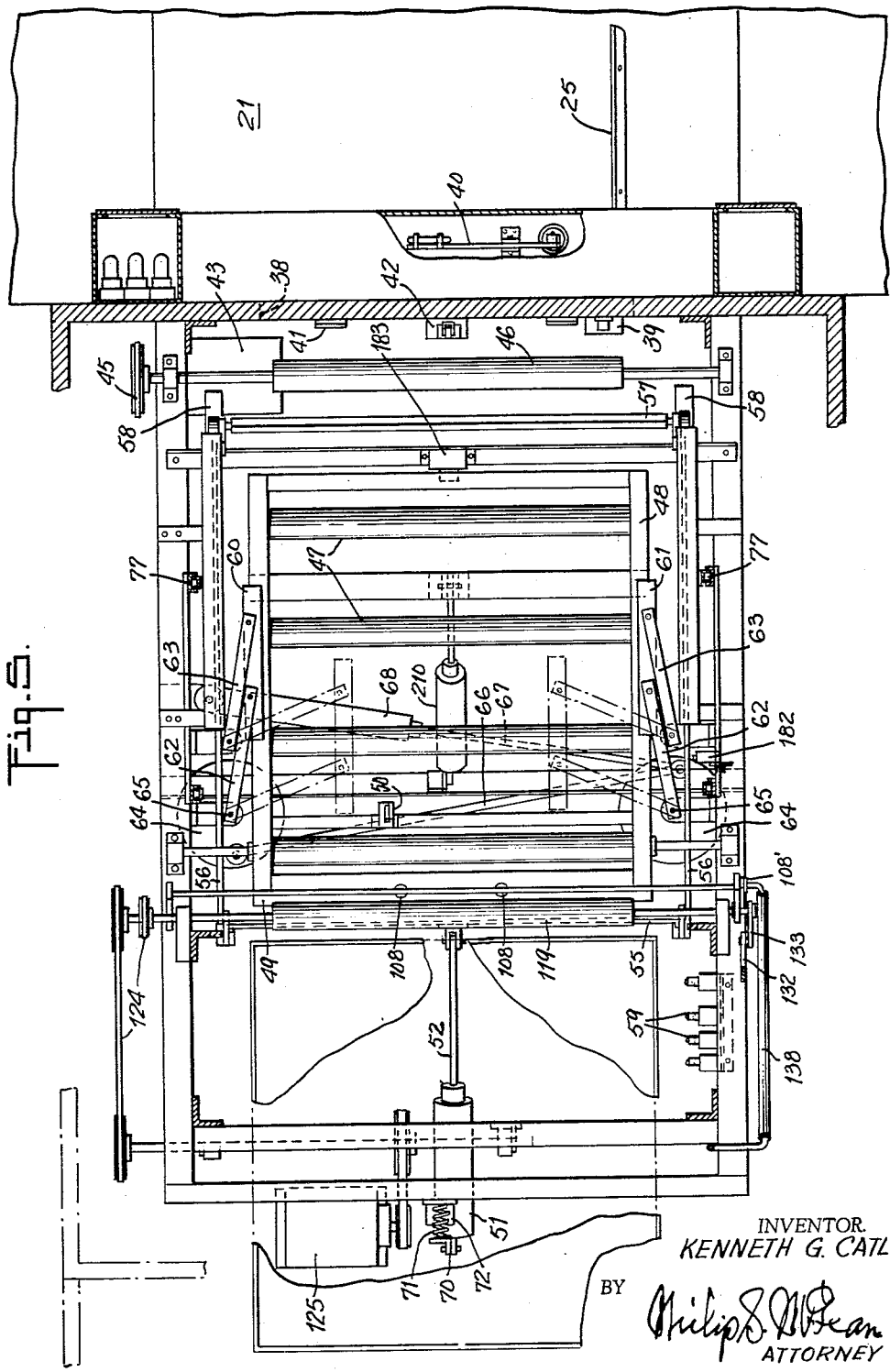

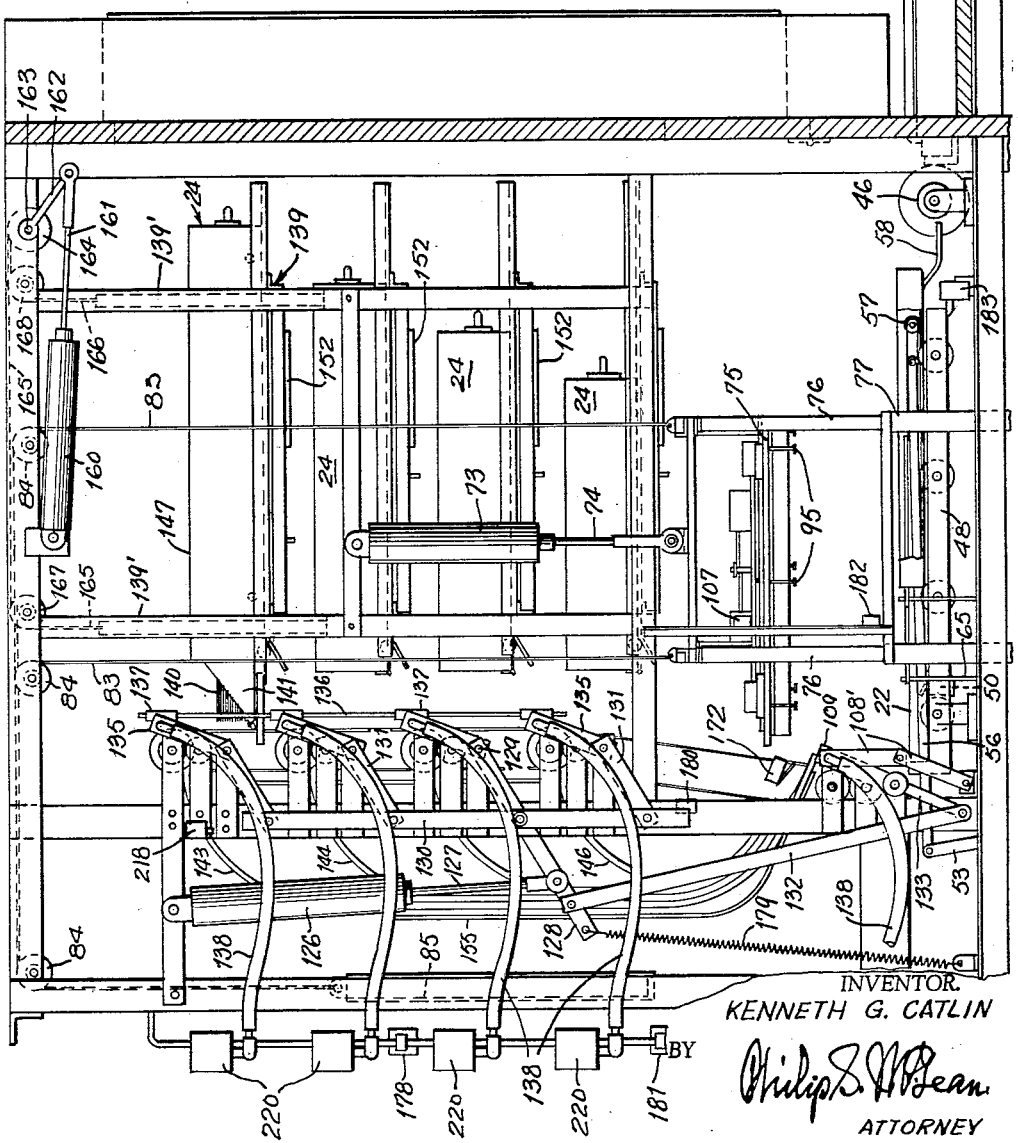

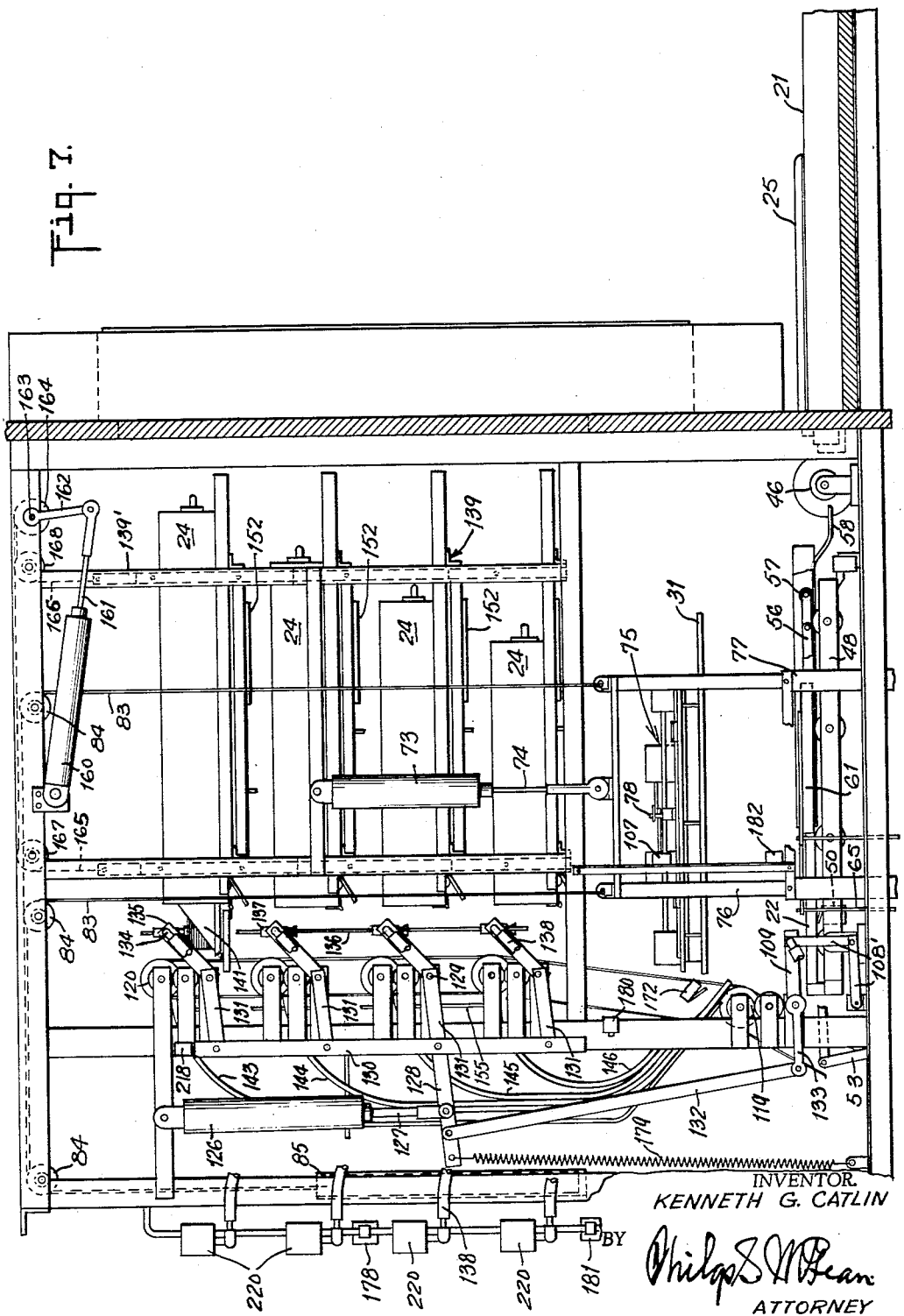

Sept. 22, 1964 K. G. CATLIN 3,150,263
CASSETTE UNLOADING AND RELOADING MACHINE
Filed Dec. 5, 1962 19 Sheets-Sheet 8
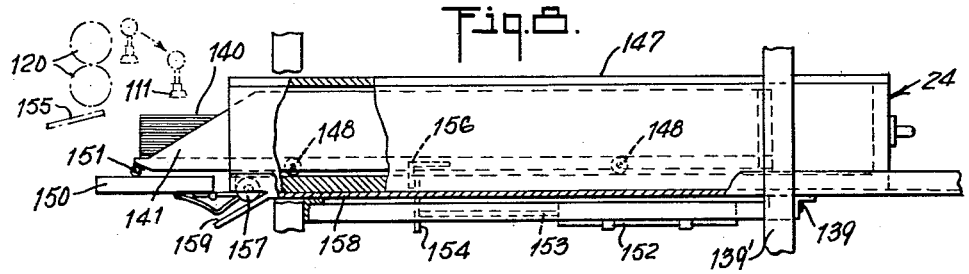
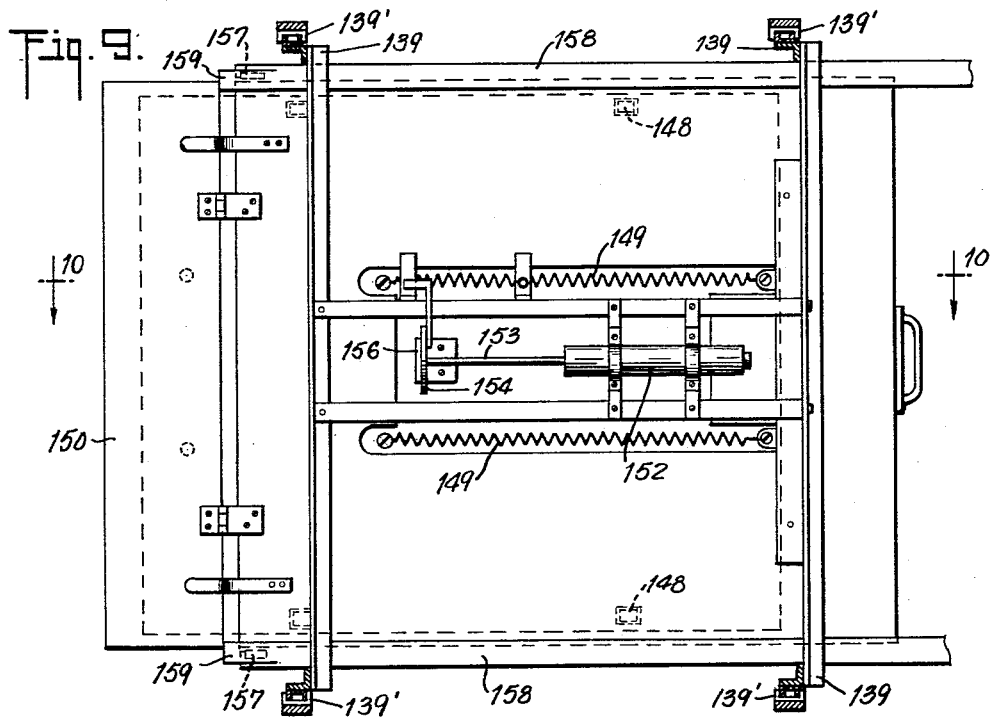
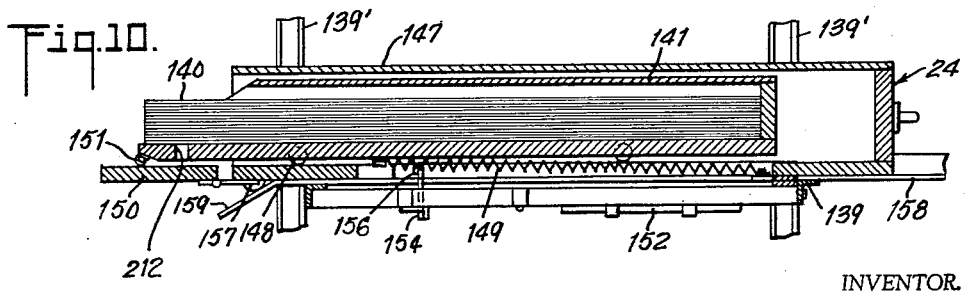
INVENTOR.
KENNETH G. CATLIN
BY
ATTORNEY Sept. 22, 1964 K. G. CATLIN 3,150,263
CASSETTE UNLOADING AND RELOADING MACHINE
Filed Dec. 5, 1962 19 Sheets-Sheet 9
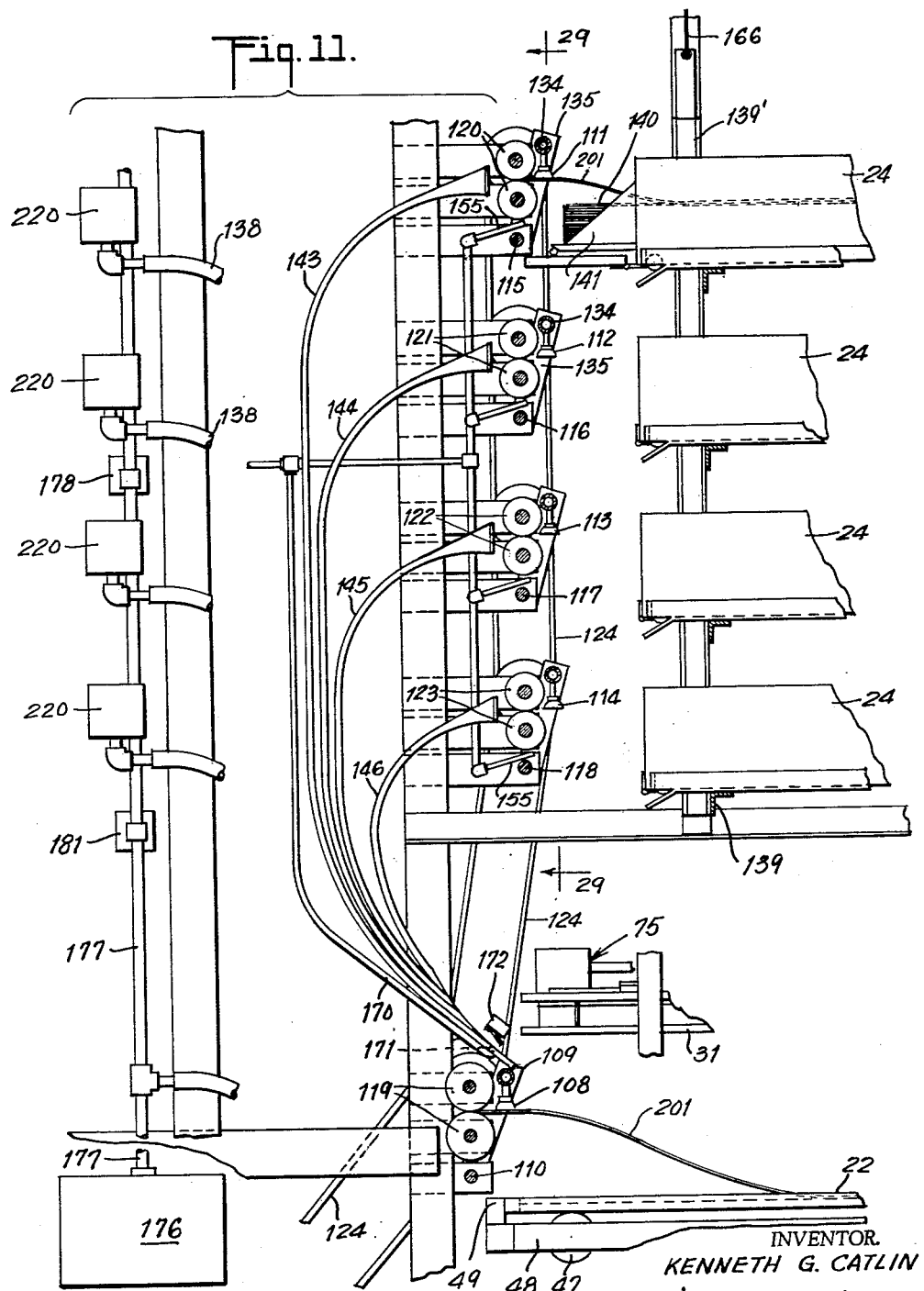
INVENTOR.
KENNETH G. CATLIN
BY
ATTORNEY

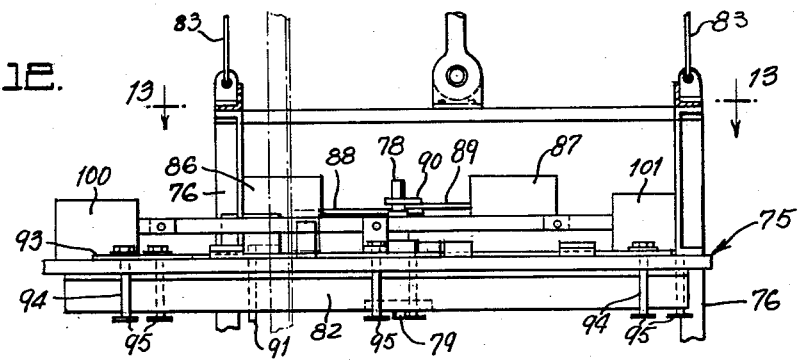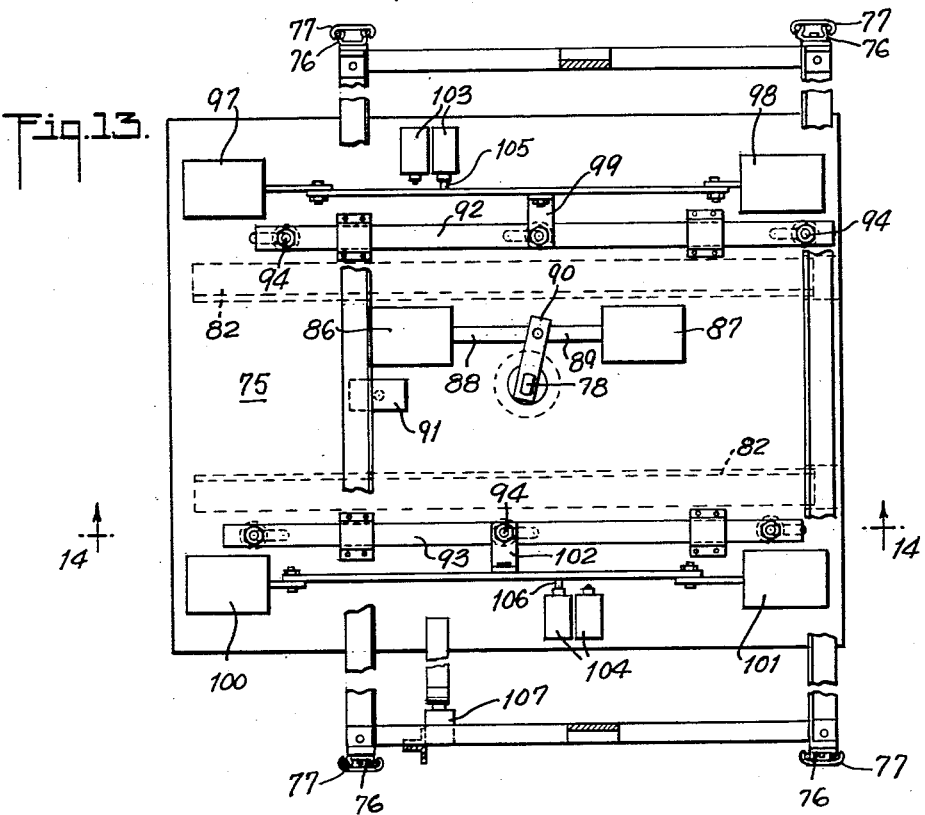

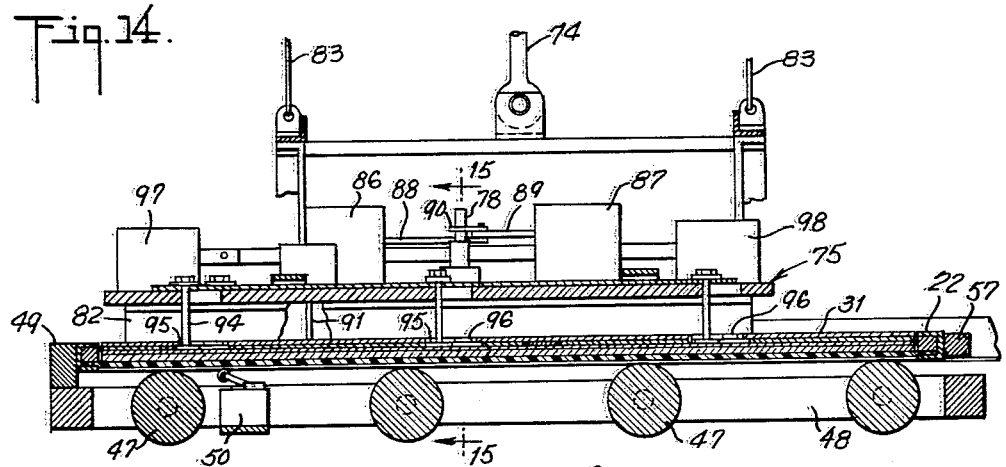
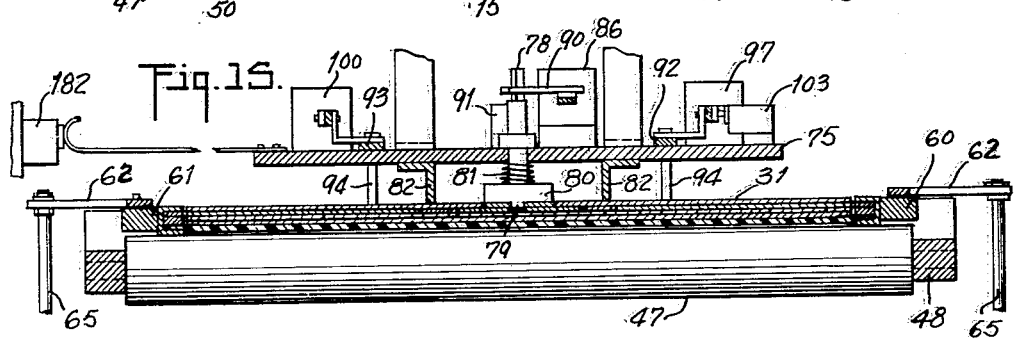
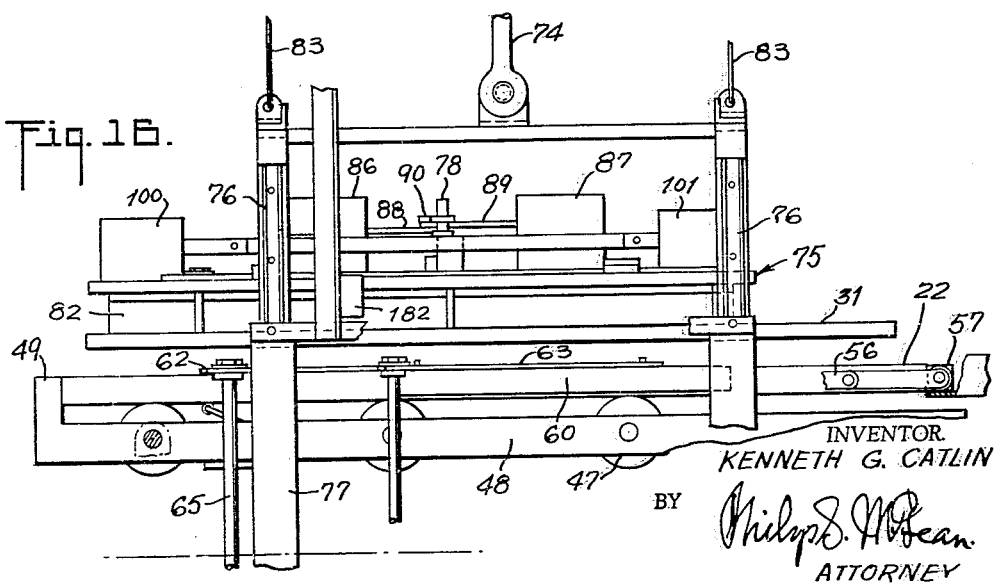

Sept. 22, 1964 K. G. CATLIN 3,150,263
CASSETTE UNLOADING AND RELOADING MACHINE
Filed Dec. 5, 1962 19 Sheets-Sheet 12

INVENTOR.
KENNETH G. CATLIN
BY
ATTORNEY

INVENTOR.
KENNETH G. CATLIN
ATTORNEY

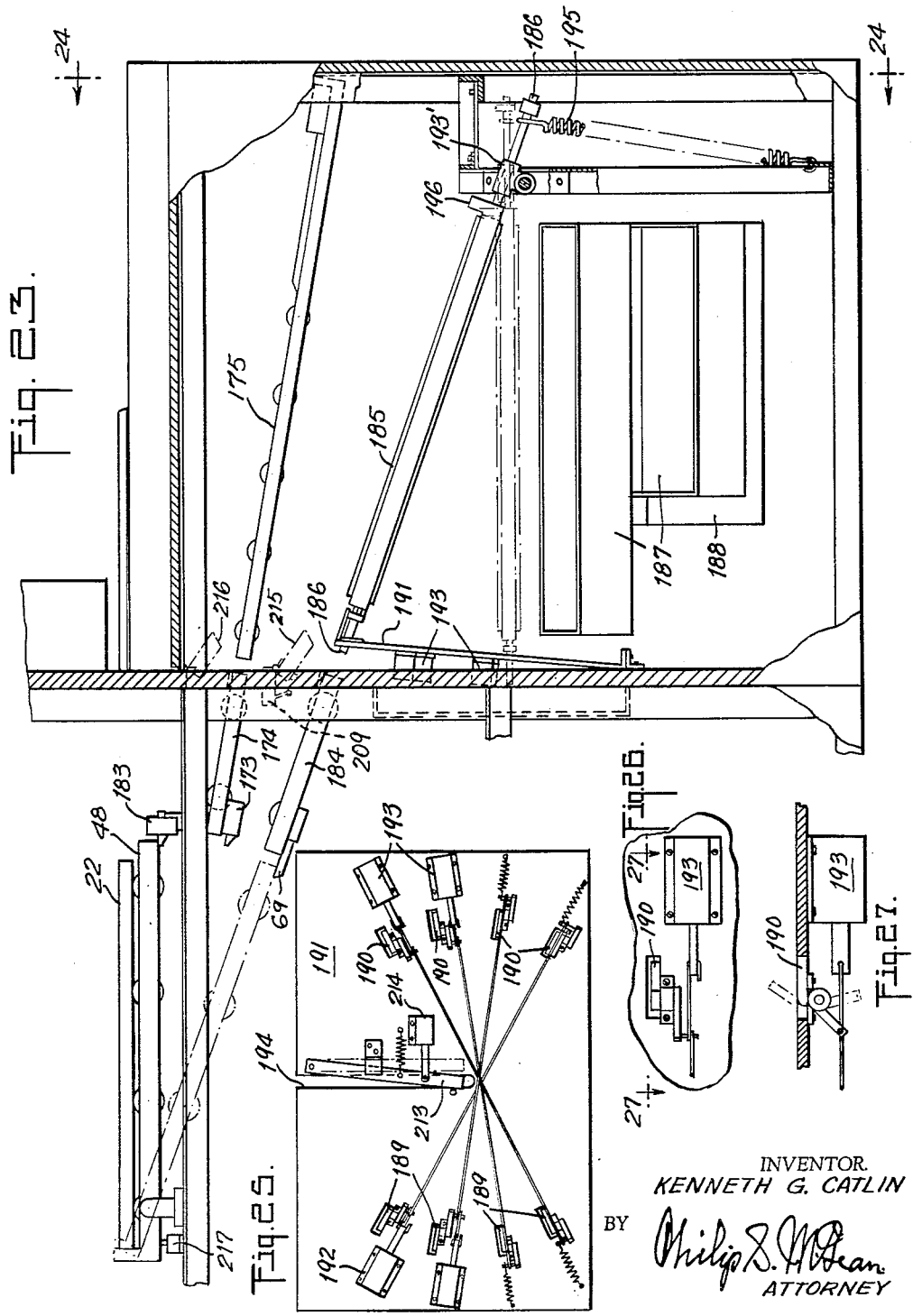

Sept. 22, 1964            K. G. CATLIN            3,150,263
CASSETTE UNLOADING AND RELOADING MACHINE
Filed Dec. 5, 1962            19 Sheets-Sheet 15
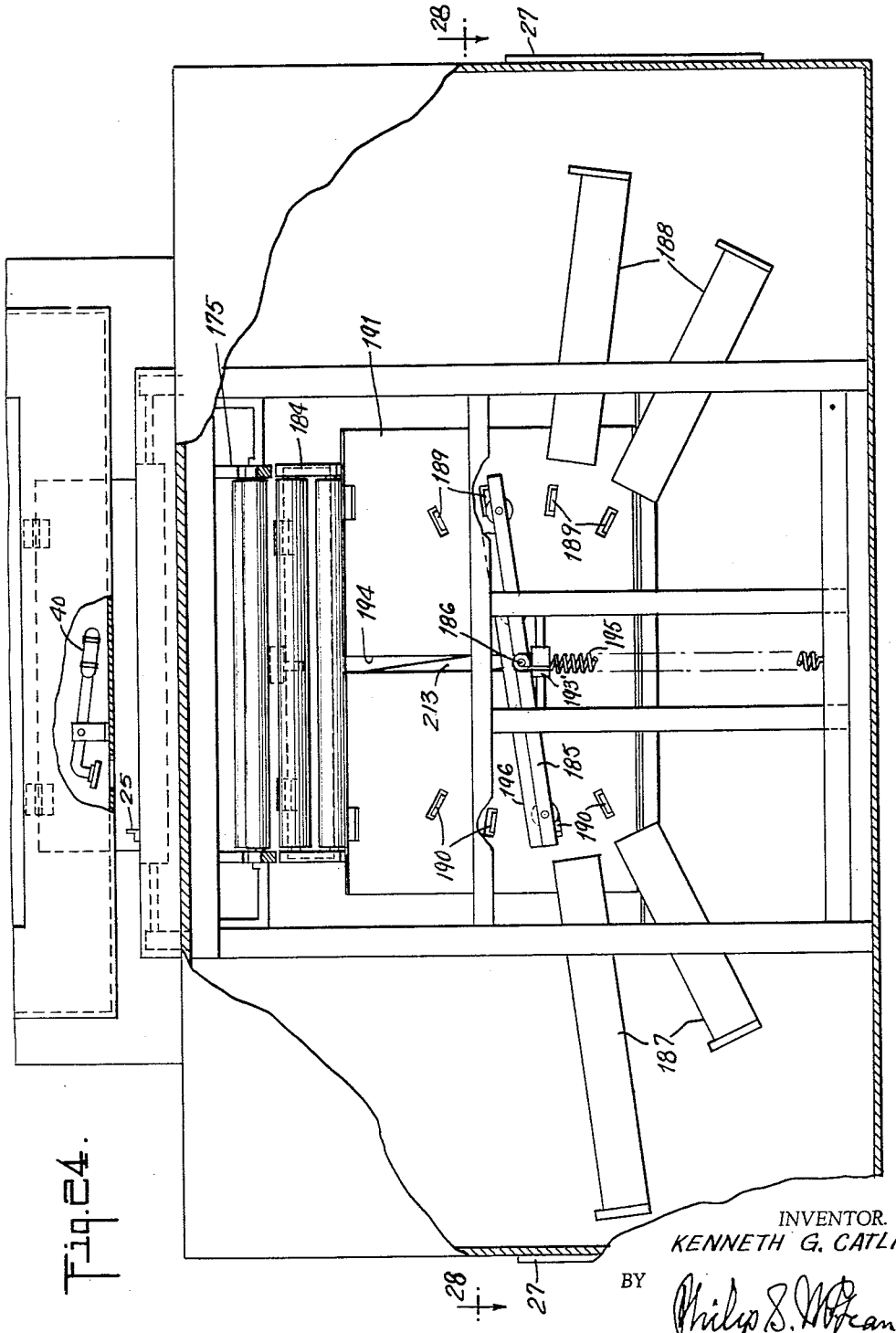
INVENTOR.
KENNETH G. CATLIN

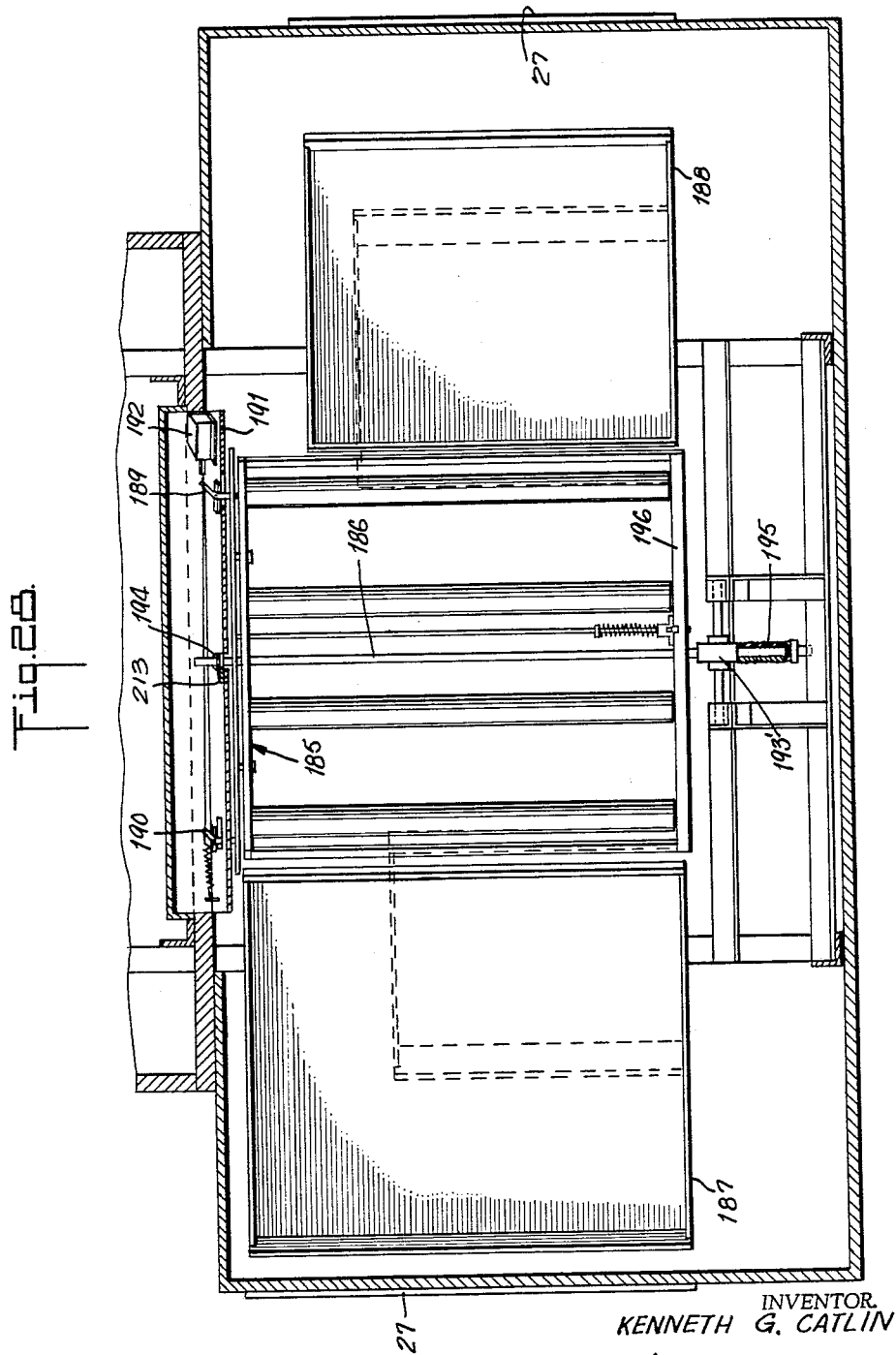

Sept. 22, 1964   K. G. CATLIN   3,150,263
CASSETTE UNLOADING AND RELOADING MACHINE
Filed Dec. 5, 1962   19 Sheets-Sheet 17
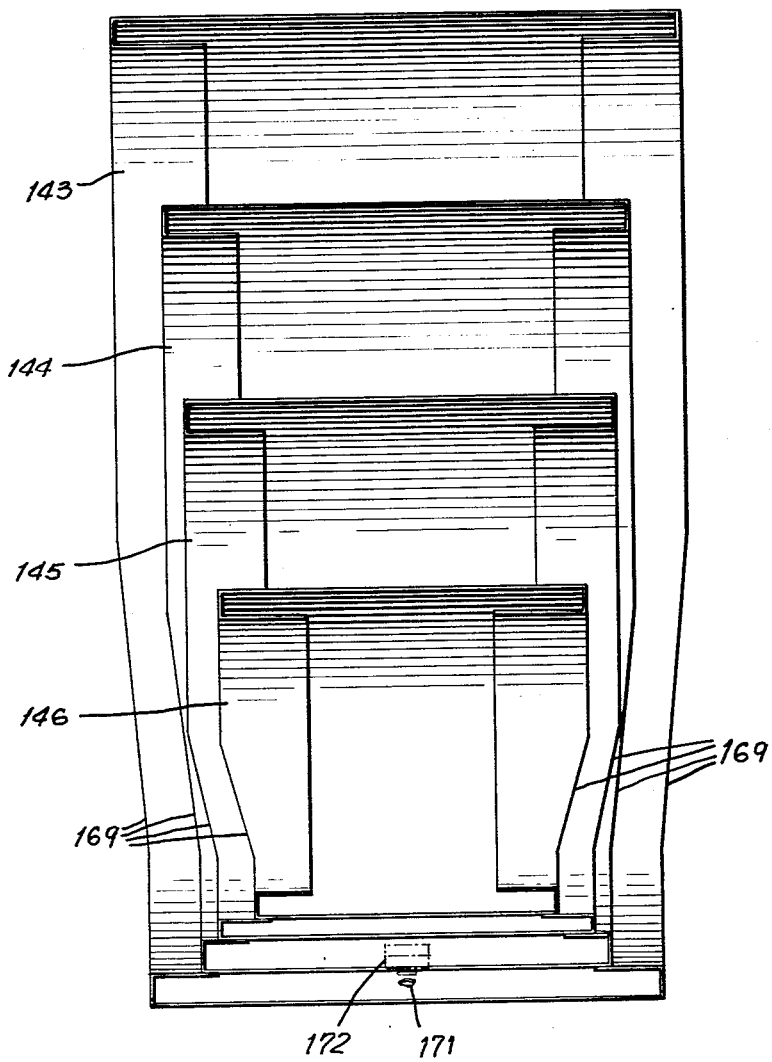
INVENTOR.
KENNETH G. CATLIN
BY
ATTORNEY Sept. 22, 1964 K. G. CATLIN 3,150,263
CASSETTE UNLOADING AND RELOADING MACHINE
Filed Dec. 5, 1962 19 Sheets-Sheet 18
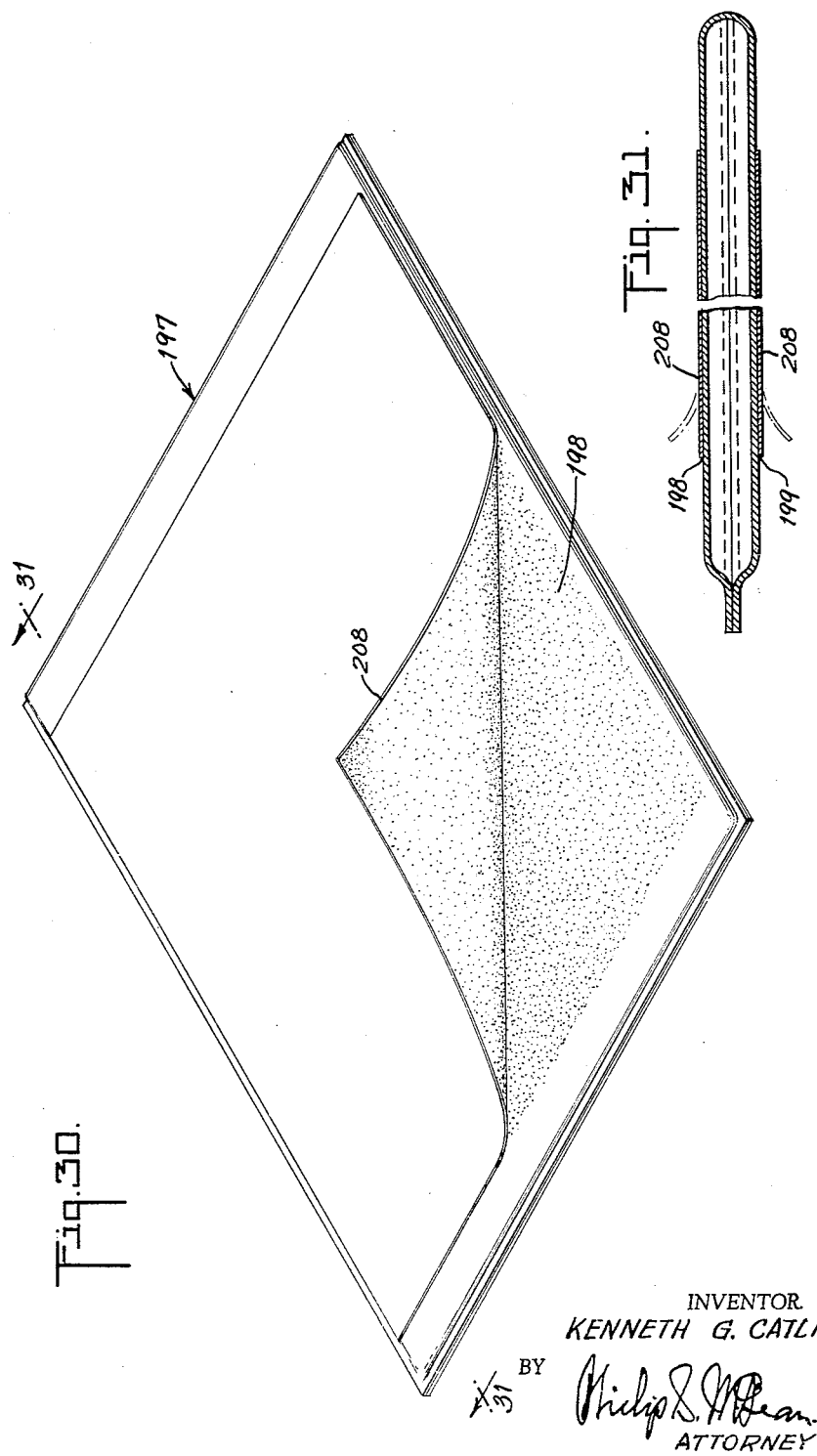
INVENTOR.
KENNETH G. CATLIN
BY
ATTORNEY

United States Patent Office 3,150,263
Patented Sept. 22, 1964

3,150,263
CASSETTE UNLOADING AND RELOADING
MACHINE
Kenneth G. Catlin, 43 Evergreen Place,
Basking Ridge, N.J.
Filed Dec. 5, 1962, Ser. No. 242,385
17 Claims. (Cl. 250—66)

The invention herein disclosed relates to the unloading and reloading of the cassettes used in radiography.

The objects of the invention primarily are to provide practical and efficient means for automatically removing exposed film from used cassettes, forwarding the exposed film to a cooperating processor or to temporary storage, reloading the emptied cassettes with fresh film of the same size and then returning reloaded cassettes to a station ready for reuse or for storage in readiness for reuse.

In connection with this automatic procedure it is a purpose of the invention to assure that the film is held evenly and uniformly in the cassettes in contact with the intensifying screens and in condition to be readily removed and replaced by the automatic handling mechanism.

Special objects of the invention are to provide the apparatus indicated in fully dependable form and at a cost reasonable for general adoption and use.

Many other desirable objects accomplished by the invention and the novel features of construction, combination and relations of parts through which the purposes of the invention are attained are set forth and will appear in the course of the following specification.

The drawings accompanying and forming part of the specification are illustrative of a present commercial embodiment of the invention. Structure however may be modified and changed as regards this illustration, all within the true intent and scope of the invention as hereinafter defined and claimed.

FIG. 2 is a broken vertical sectional view looking into the back of the machine substantially on the plane of the line 2—2 of FIG. 1.

FIG. 3 is a broken and part sectional view on the general plane of line 3—3 of FIG. 2.

FIG. 4 is a broken vertical sectional view of the lower portion of the machine on substantially the plane of line 4—4 of FIG. 2.

FIG. 5 is a broken and substantially horizontal sectional view on substantially the plane of line 5—5 of FIG. 4.

FIG. 6 is a broken vertical sectional view on substantially the plane of line 6—6 of FIG. 2, showing the platen in upper position and the top magazine opened for removal of fresh film.

FIG. 7 is a view of the same parts, showing the platen lifting the back of the cassette, the pickup devices advanced into position over the cassette and the film magazine, and the magazine raised to carry the top film into engagement with the suction cups of the upper pickup.

FIG. 8 is a broken part sectional side elevation of one of the film magazines, opened and with the film carrying tray projected into position for engagement of the top film with the suction cups.

FIG. 9 is a bottom plan view of the same.

FIG. 10 is a broken cross sectional view through the film magazine shown in FIG. 9 on substantially the plane of line 10—10 of FIG. 9.

FIG. 11 is a broken vertical sectional view, illustrating removal of an exposed film from the opened cassette and the feeding of a fresh film from the opened top magazine into the feed chute leading down to the opened cassette.

FIG. 12 is a broken part sectional detail of the platen which opens and closes the cassette, showing it in the upper inactive position.

FIG. 13 is a broken horizontal sectional view on substantially the plane of line 13—13 of FIG. 12, showing the reversely acting solenoids for keying the platen to the removable backs of the cassettes and for unlocking and relocking the removable backs of the cassettes.

FIG. 14 is a vertical sectional detail of the platen, ready to be locked to the back of a cassette, for lifting the same, this view taken on substantially the plane of line 14—14 of FIG. 13.

FIG. 15 is a broken cross sectional detail on substantially the plane of line 15—15 of FIG. 14, showing particularly the spindle on the platen for effecting the unlocking and relocking of the back of the cassette.

FIG. 16 is a broken part side elevation, showing the platen lifting the back of the cassette.

FIG. 23 is a broken part sectional view of the mechanism for sorting the cassettes according to film size.

FIG. 24 is a broken side elevation of the same partly in section, on substantially the plane of line 24—24 of FIG. 23.

FIG. 25 is a detail view of the index plate for directing loaded cassettes to their destinations according to film size.

FIGS. 26 and 27 are broken details of the trigger mechanism for controlling directed travel of the loaded cassettes, FIG. 27 being taken on section line 27—27 of FIG. 26.

FIG. 28 is a horizontal sectional view of the sorting mechanism on substantially the plane of line 28—28 of FIG. 24.

FIG. 29 is a broken detail view of the chutes for directing the different size films from the magazines down into the cassettes being loaded, this view being taken looking in the direction of arrow 29 in FIG. 11.

FIG. 30 is a perspective view of one of the air cushions for holding the intensifying screens under uniform pressure in the cassettes, this view showing the protective cover on one side being removed to expose the adhesive surface for holding the airbag in place.

FIG. 31 is an enlarged broken sectional view on substantially the plane of line 31—31 of FIG. 30.

Figure 1:
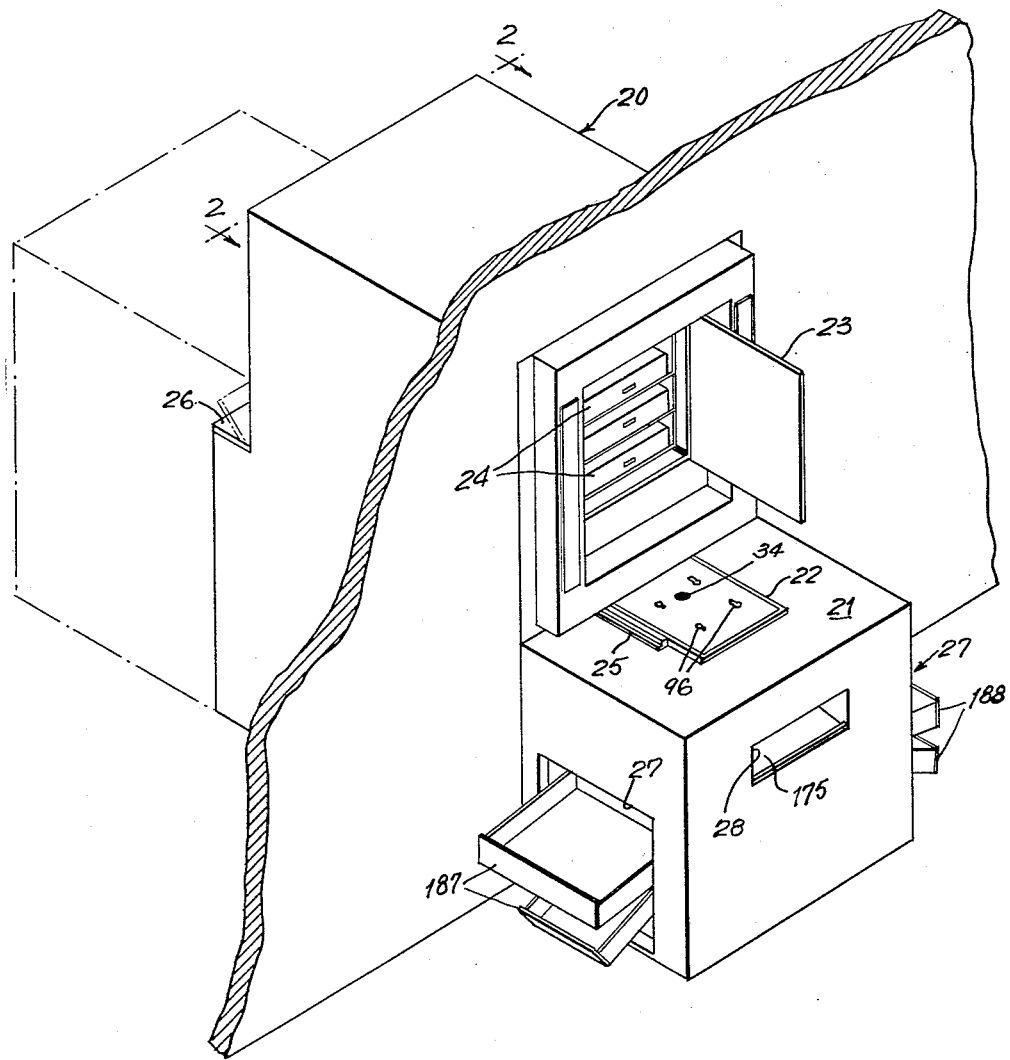
FIG. 1 is a perspective view of one of the new cassette loaders, showing a cassette in position on the feed table ready to be fed into the machine and showing additionally how the access door at the front of the machine may be opened for insertion of magazines of fresh film.

In the general view, FIG. 1, the machine is shown as apearing as a colsed cabinet 20 of medium size, having a feed table 21 at the front of the same for the insertion of the cassettes 22 into the machine and above this table an access door 23 for insertion and removal of magazines 24 for fresh film, in the different sizes ordinarily in demand.

A side gauge 25 is shown on the table to aid in positioning a cassette for proper entry into the machine.

At the back of the machine there is shown an outlet extension 26 through which exposed films taken from the cassettes may be directed to a film processing machine, indicated in broken lines, or to a storage receptacle or other receiver.

Below the table, openings 27 are provided at opposite sides for bins 187 and 188 for the cassettes of different size which have been loaded with fresh film.

At the front of the machine beneath the table there is shown an opening 28 for a support or receiver 175 for rejected cassettes which for any reason may have missed being loaded with film.

The cassettes, as shown in FIGS. 17 to 21, are of special construction, consisting of frames 29 carrying radioparent front walls 30 and removable opaque back walls 31.

These back walls have means for securing them in place, so located that in all different sizes of cassettes, such means will cooperate with the back releasing mechanism in the machine.

Figure 17:
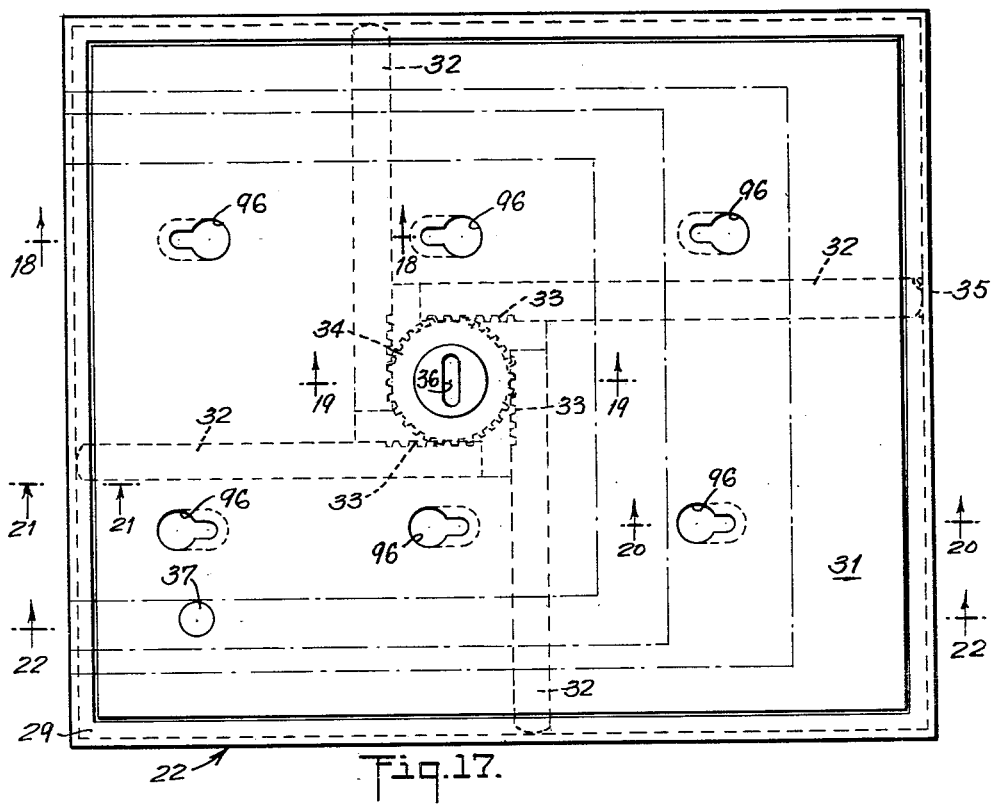
FIG. 17 is a general plan view of one of the cassettes with broken lines showing the slides for locking the removable back, in their extended holding position.
Figure 18:
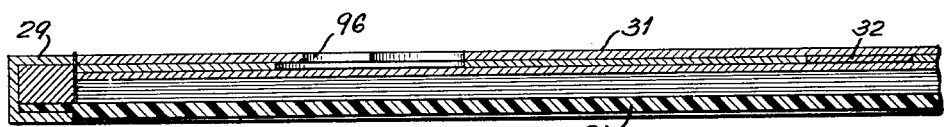
FIGS. 18, 19, 20, 21 are broken sectional details of the cassette on substantially the planes of the lines 18—18, 19—19, 20—20, 21—21 in FIG. 17.
Figure 19:
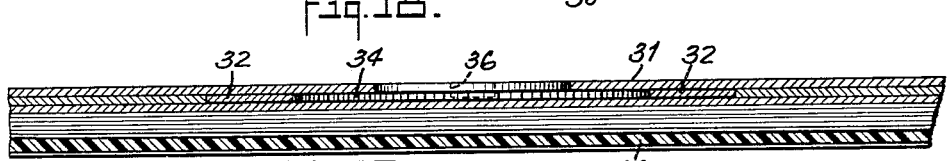
Figure 20:
Figure 21:
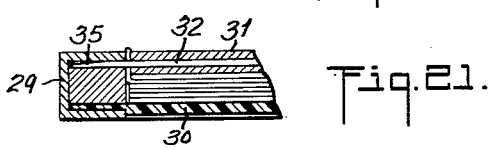

Specifically this is shown in FIG. 17 as embodying bars 32 slidably mounted in the backs having racks 33 at their inner ends engaged with pinions 34 rotatably mounted in the backs, said slide bars being engageable in openings 35 in the cassette frames.

FIG. 17 shows in broken lines, within the outline of the larger size cassette illustrated, the smaller size cassettes and illustrates the fact that in all these sizes the locking and unlocking pinion 34 is located on the same center line and on the same distance back of the front edge of the cassette so as to be in the same relative position within the machine and therefore located to be engaged by an actuating drive spindle within the machine.

The operating pinions are shown as cross slotted at 36 to receive a driving element in the nature of a screw driver blade on the end of the actuating spindle mentioned.

To insure the entry of the cassettes into the machine properly aligned for the releasing pinions to meet the actuating spindle, each cassette is provided with an element cooperable with a companion element in the machine to permit entry of the cassette into the machine.

In the illustration there is an iron plug or disk 37 seated in the back of the cassette, in the same position in different size cassettes, for instance two inches from the side which engages the side gauge 25 and two inches back from the leading edge and which plug will magnetically cooperate with a tilting mercury switch located over the entranceway for the cassette, connected to effect the releasing movement of a latch which normally holds a door closed against entrance of a cassette.

Since this plug is essential to the door releasing function the cassettes of different sizes can be entered in the machine only when properly positioned for entry into the machine.

In FIG. 4 the trap door which normally closes the cabinet light-tight, against the entrance of a cassette, is shown at 38, with an electromagnetically released latch 39 for securing it, actuated by mercury switch 40 under impulse of the paramagnetic disk 37 in the back of the cassette.

The trap door 38, FIG. 4, is tensioned to closed position by a spring hinge 41 where it is normally held by latch 39. When latch 39 is released through action of the mercury switch 40, the door may be pushed open by the cassette being entered.

In this opening movement the trap door actuates a switch 42 for starting a motor 43, which through belt and pulley connections at 44, 45 drives a roll 46 for carrying the inserted cassette forward over rolls 47 in a bed frame 48, against a positioning stop 49.

In the course of this travel the cassette operates a switch 50 on the bed 48 controlling admission of air to a cylinder 51, FIGS. 2 and 4, which by piston rod 52 pulls a frame 53, pivoted at the bottom at 54, to the left as shown by broken lines in FIG. 4, thus through cross bar and link connections 55, 56 to draw a follower or pusher 57, FIGS. 4 and 5, up over the inclines 58 into position behind the outer end of the cassette.

By this means the cassette is advanced into engagement with the front stop 49. In accomplishing this the swinging lever frame 53, FIG. 4, actuates one of the sequentially placed switches 59, closing a circuit for selecting and opening a magazine of films of the same size as that in the entered cassette. Also the thus actuated switch opens the vacuum valve in a manifold to prepare one of the upper pickups to extract the top film from the opened magazine and the lower pickup to take film from the opened cassette.

The cassette containing the exposed film is thus in effect calibrated by the cassette feed mechanism and utilized to trigger or set the magazine of that size film, in readiness for reloading the cassette, after it has been emptied.

At or about the time the cassette is being fed up against the front stop, side gauges shown at 60, 61 FIG. 5, are brought in against opposite sides of the cassette to locate it centrally with respect to the mechanism for unlocking and lifting the back of the cassette.

These side gauges 60, 61 are shown in FIG. 5, each carried by a pair of parallel swinging links 62, 63, with the links 62 fixed to disks 64 on upright shafts 65; said disks connected to rotate in unison in opposite directions by a pivoted rod 66 and one of these disks, the lower one in FIG. 5 connected by piston rod 67 with an air cylinder 68 so that with energization of this cylinder from switch 50 the entered cassette will be centered against the front stop regardless of its film size.

The lever and linkage connections 53, 55, 56, FIG. 4, for operating the follower or feed bar 57, arrested by having engaged the cassette with the front stop and closing one of the switches 59 indicating size of cassette in transit, admits air to a cylinder under the corresponding size selected film magazine to open that magazine and present the film supply of correct size for reloading.

The cassette feeding and grading cylinder 51, as shown in FIG. 4, is pivotally mounted on a lever 70, pivoted at its lower end and tensioned by a spring 71 away from a switch 72. With continued air pressure the cylinder 51 will pull lever 70 against the force of spring 71 to close switch 72. This switch 72, controls admission of air to cylinders 73, FIGS. 6 and 7, having piston rods 74 connected to effect the lowering of a platen 75 which is constructed and equipped to unlock and pick up the back of the cassette on the bed.

The platen 75, as shown in FIGS. 6 and 7, is carried by posts 76 sliding in vertical guides 77 and carries a rotary spindle 78, FIGS. 12 to 16, having a bladelike formation 79 to engage and temporarily interlock with the head 36 of the pinion 34 in the back which has been aligned therewith.

This actuating spindle 78 is shown in FIG. 15 as having a disk 80 for resting directly on the pinion which it engages and is further shown as having limited vertical movement on the platen and as yieldingly pressed toward the pinion by spring 81 so as to accommodate itself to proper interlocking engagement with the pinion.

In this same view, FIG. 15, the platen 75 is shown as having spaced runners 82 on the bottom of it engageable with the back 31 of the cassette to limit the lowering movement of the platen.

The platen is shown in FIGS. 6 and 7 as counterbalanced by cords 83 running over guide pulleys 84 to counterbalancing means 85, such as weights or springs or combination of weights and springs so that the platen will rise smoothly and return to the elevated position shown in FIG. 6 when air is exhausted from the platen lowering cylinders 73.

The spindle 78 for effecting unlocking and relocking of the cassette back is actuated in the present disclosure by reversely acting solenoids 86, 87, FIG. 13, having cores 88, 89 connected with a radial arm 90 on the upper end of the spindle, one, in this case solenoid 86, acting to turn the spindle in the direction to unlock the back and the other, 87, in reverse direction to lock the back in place.

Unlocking and relocking solenoids 86, 87 are controlled by switch mechanism indicated at 91, FIGS. 12 and 13, operated by engagement with the cassette back in the lowering movement of the platen.

A lifting connection of the platen with the back after it has been released from the cassette frame is provided in the present illustration by bars 92, 93 slidingly mounted on the platen, carrying dependent pins 94 having disks 95 at the lower ends of the same to enter and interlock in keyhole openings 96 in the backs of the cassettes.

These slides 92, 93 carrying the projections 95 which key into the backs of the cassettes are actuated by opposed solenoids 97, 98, FIG. 13, connected at 99 with slide 92 and similar opposed solenoids 100, 101, connected at 102 with slide 93.

The solenoids 86, 87 for unlocking and relocking the backs and the solenoids 97, 98 and 100, 101 for effecting connection and disconnection of the platen with respect to the backs may all be controlled from switch 91, FIG. 12 and 13, which is actuated in the lowering movement of the platen.

Switches 103, 104, FIG. 13, actuated by projections 105, 106 on the solenoid connections 99, 102 in the coupling movement of the lifting keys with the backs actuate a magnet valve for releasing air from the platen lowering cylinders 73 enabling the platen then to rise by the counterweighting and spring loading, thus to lift the back to an elevated position, uncovering the film in the opened cassette.

In rising to this elevated cassette open position, FIG. 7, the platen actuates a switch 107, which, in concert with the switch 91 still closed by continued contact with the back, initiates the action of pickup devices for removing the exposed film from the opened cassette, pickup means for removing fresh film from the opened magazine of the same size film and operation of feed rollers to carry off the exposed film and to start the unexposed fresh film to the emptied cassette. This same switching combination in the machine here shown also turns on a vacuum pump for the pickups and supply of air for the air jet film separators and for the air switch which detects passage of film into the cassette.

FIGS. 6, 7 and 11 show the pickup devices for removing the film from the cassette as suction cups 108 carried by arms 109 pivoted to swing on center 110 and the pickups for the four film magazines as suction cups 111, 112, 113, 114 pivoted on centers 115, 116, 117, 118 in line with the respective magazines.

The feed rolls for carrying away the exposed film are indicated at 119 and the feed rolls for removing fresh film from the magazines are designated 120, 121, 122 and 123, FIG. 11.

All these feed rolls are shown as driven by belt and pulley connections 124 from motor 125, FIGS 2 and 5, located in the base of the machine.

Necessary rocking motion is simultaneously imparted to all the film pickup devices, the lower unit, removing film from the opened cassette and one of the upper ones, taking film from the corresponding opened film magazine, by a single air cylinder 126, FIGS. 6 and 7, having a piston rod 127 connected to rock a lever 128 pivoted on center 129 and having an upright link 130 pivotally connected therewith and pivotally connected with lever arms 131 extending from the pivot centers of the upper pickups and a link 132 pivotally connected with a lever arm 133 extending from the pivotal support of the lower pickup arm 109.

The upper suction cups are carried by tubular shafts 134 rotatably mounted in the pivoted carrying arms 135 and these shafts are controlled to hold the suction cups of the four series in vertical alignment by a rod or rods 136 engaged in vertically aligned sleeves 137 connected with said shafts.

The suction connections to these rotatably mounted tubular shafts are indicated at 138.

The suction cups 108 of the lower pickup are maintained in vertical alignment by the parallel linkage indicated at 108'.

The lower pickup for removing film from the opened cassette has a greater range of movement than the pickups for removing film from the magazines. Accordingly the link 132 for operating the lower pickup is connected with lever 128, FIGS. 6 and 7, at a point to give this advantage.

Only that one of the four upper pickups is energized by selector switch 59 FIG. 4, and vacuum valve 220, FIG. 7, which corresponds with the one opened magazine, assuring proper sealing of the vacuum system.

The magazines 24 for the different size film are shown in FIGS. 6 through 11 as mounted in a rack 139 which is vertically shiftable on guides 139' to bring the stack of film in a magazine which has been selected into engagement with pickups positioned to meet that stack.

This vertical movement of the magazine rack assures that the uppermost film remaining in a stack of film will be presented to the vacuum cups.

Should there be no film left in a supply magazine the vacuum cups find themselves positioned over air holes 212, FIG. 10, in the bottom of the open tray, preventing sealing and thereby stalling operations.

In practice this condition may be utilized to sound a warning informing an operator or supervisor of need for replenishment of films.

Additionally, it is a feature of the invention that when a supply magazine is exhausted a notifying signal may be given the operator. Also the access door to the film magazines may be held closed so long as any film magazine is open, thus to prevent spoiling of film lying in an opened cassette or opened magazine.

FIG. 6 shows the pile of film 140 on a tray 141 extended from the opened upper magazine and FIG. 7 shows the corresponding pickup projected over the top of the film stack and the rack raised to bring the upper film of that stack into engagement with the pickup.

As this contact of top film is made the pickup is raised, as indicated in FIG. 11, to carry the top film into the grasp of the upper feed rolls 120 which advance the film into the feed chute 143 leading down to the opened cassette, below the lifted cassette back.

At or approximately the moment of contact an air jet delivered by tubing 155, FIG. 11, initiated by switch 107, assists in separation of the top film and the floating of the separated film into grasp of the feed rolls.

The successive feed rolls 121, 122 and 123 and corresponding film guide chutes 144, 145, 146 for the smaller size film in the magazines below the top one are illustrated in FIG. 11, it being noted that the guide chutes of successively smaller size film are located one above the other for delivering the proper size film into an opened cassette.

The removable light-tight magazines, reloadable from conventional supply packages are shown in FIGS. 8, 9, 10, each in the form of a boxlike enclosure 147 open at the inner end and containing the slideable tray 141 which carries the stack of film. This tray is shown as operating on rollers 148 and as normally held retracted in the containing box by springs 149.

A light-tight spring closed door 150 is provided at the front end of the box and this is arranged to yield and to be pushed open by the film tray which is shown provided with rollers 151 at the inner end for pushing engagement with the door.

An air cylinder 152 on the rack, beneath each magazine provides the power for opening the magazine and projecting the film carrying tray. This cylinder is shown in FIGS. 9 and 10 as having a piston rod 153 carrying a disk 154 engageable with an abutment 156 dependent from the tray.

The magazines are shown as having trundle rollers 157 at their inner ends enabling them to be entered on a downwardly slanting incline to position the lugs 156 on the bottoms of the trays in front of the disks 154 of the actuating cylinders 152.

When fully in position on the supporting tracks 158 provided therefor on the rack, the trundle rollers reach in over the downward inclines 159 at the inner ends of the tracks allowing the magazines to rest solidly on the flat horizontal supporting tracks.

The raising of the rack necessary to lift the top film into engagement with the pickup positioned over the same is effected in the illustration by an air cylinder 160, FIGS. 6 and 7 having a piston rod 161 connected with an arm 162 on shaft 163 carrying a drum 164 for cables 165, 166 extending over guide pulleys 167, 168 to upper end portions of the rack 139. Cylinder 160 is actuated by switch 218 on upward movement of linkage bar 130.

The film commonly used in radiography, for manufacturing and other reasons, has a tendency to curl. In a package this curl tends to be systematically in one direction throughout the stack.

It is good practice to place the film in a cassette with the concave curvature downward, facing the radioparent front of the cassette. This assures that the film will stay in place in the cassette through the effect of suction when the cassette is suddenly opened for unloading.

To meet these conditions and for other reasons disclosed it is a practice with the present invention to stack the film in the magazines with the concave side upward so that with the reversal of the film effected in the travel down through the guide chutes the film will reach the cassette with the concave side downward, as desired.

This reversal of the film to place the concave face downward is also of advantage in that the film settles into the cassette with a tendency to flatten down and not curl up at the edges, which otherwise might conceivably interfere with locating an entering film squarely in place in the cassette and possibly interfere to some extent with the replacing of the back of the cassette over the entered film.

To insure the film sliding straight and free through the guide chutes they may be constructed as shown in FIG. 29, wider at the top or entry ends and as having downwardly and inwardly inclined side edges 169 to straighten and center any film requiring such adjustment.

The time required for removal of fresh film from a magazine and passage of same down to the cassette is greater than that required for removal of exposed film from the cassette, thus insuring that the cassette will be emptied of exposed film before fresh film to replace the exposed film has reached the cassette.

It is important in this invention that unexposed film be placed in the emptied cassette before that cassette be discharged from the machine as a loaded, ready to use cassette.

Accordingly there is provision to make sure that fresh film is fed into an emptied cassette or, if not that an unloaded cassette be detected and diverted from other loaded, ready to use cassettes.

In the machine illustrated this is accomplished by provision of an air jet 170, FIG. 11, initiated by switch 107, positioned to direct a flow of air through an opening 171 in the end of the lower film chute toward an air switch 172 at the opposite side of the chutes, which controls a stop 173, FIG. 4, for arresting the lowering movement of the cassette bed 48 at a point where the released cassette will pass over an upper guide 174 and be diverted by that to a receiving support or holder 175 for rejected cassettes.

If the air switch 172 senses passage of a film the stop 173 is retracted permitting the bed to drop to a lower fixed stop 69 from which point the cassette will pass on to the sorting mechanism to be described.

A time delay circuit initiated by return of the rocker arm delivering fresh film to the upper feed rollers allows sufficient time for such film to fall down through the chute and be tested for passage by the air switch and to settle down into the cassette, then turns air pressure to the cylinders 73 which lower the platen and attached cassette back down onto the loaded film and under sufficient pressure to compress an air bag, to be described, for holding film in the cassette under uniform pressure.

The air blast from the separation jet 155, FIG. 11, lowers air pressure above the uppermost film in the magazine from which unexposed film is being taken, permitting ready separation of that film from the stack below it.

Sources of positive and negative air pressure are provided for the purposes indicated.

In FIG. 11 a vacuum pump is indicated at 176 connected by piping 177 with the tube connections to the film pickup devices.

Closure of the vacuum system by engagement of the suction cups with the exposed and unexposed films causes a rapid fall of pressure in the suction system to operate a low pressure switch 178 which releases air from cylinder 126 permitting the linkage connected with the pickups under tension of the spring 179, FIGS. 6 and 7, to return the pickups to the position shown in FIG. 6 presenting leading edges of both upper and lower films to the drive rollers 120 and 119 in the illustration, already in rotation at the time.

Return of the linkage to original position, FIG. 6, closes a switch 180 which opens a large orifice valve 181 in the suction line which releases vacuum, permitting the suction cups to surrender the films to the feed rolls.

The lower, exposed film from the opened cassette is thus delivered by feed rollers 119, FIG. 11, to an appropriate receiver such as light-tight bin or to an automatic processor such as indicated in broken lines FIG. 1, through the outlet passage 26.

Figure 32:
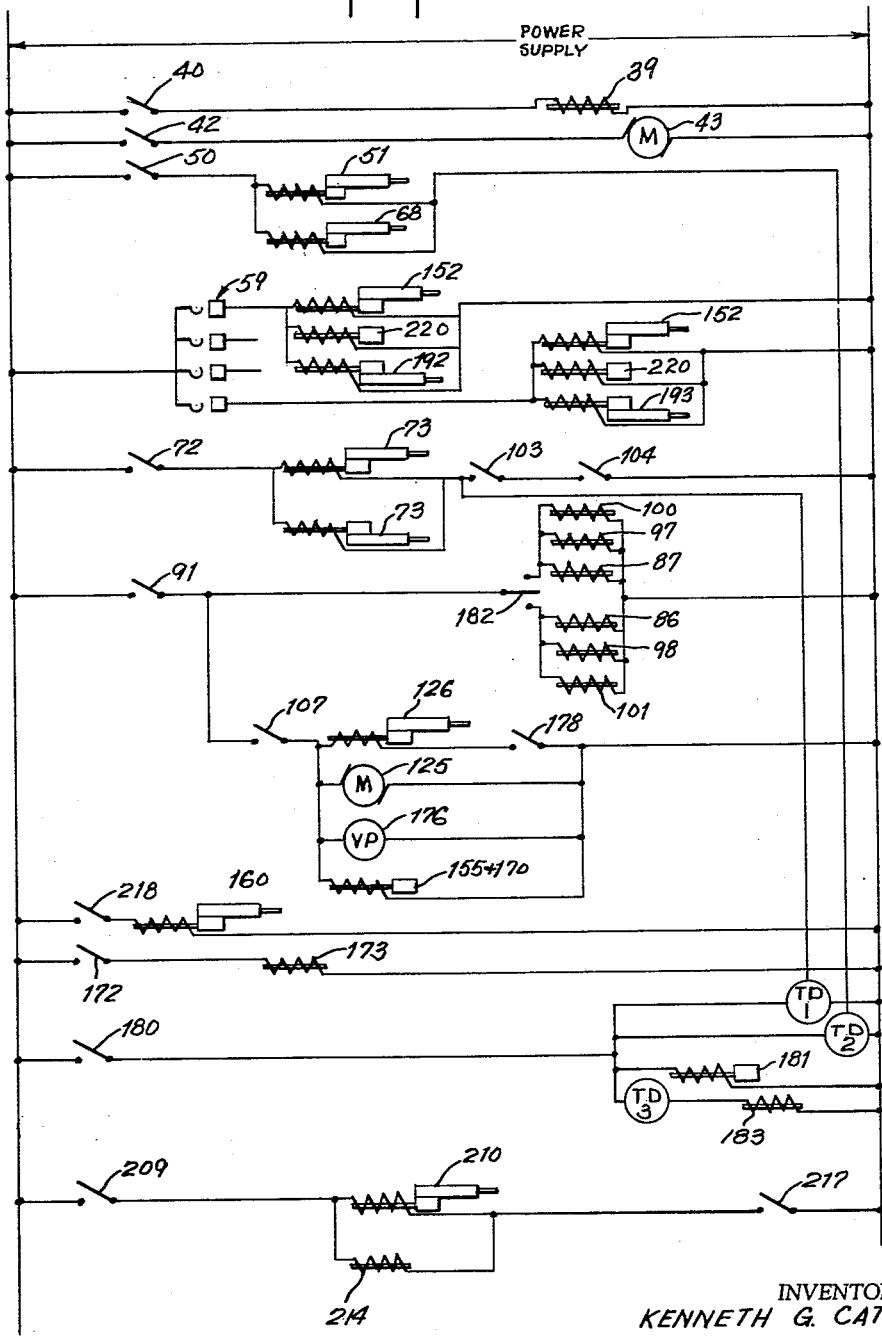
FIG. 32 is a simplified wiring diagram, showing the electrical sequence.

Switch 180 also initiates a time delay relay #1, shown schematically in FIG. 32, which momentarily shunts switches 103 and 104, restoring air to cylinders 73 forcing the platen down. When down the platen bottoming switch 182 deenergizes the unlocking solenoid 86 and energizes the locking solenoid 87 to refasten the back into the cassette and also deenergizes grasping solenoids 98 and 101 and energizes the "let-go" solenoids 97 and 100. Thus the back is secured in the cassette and the cassette is released from the platen. These movements are followed by opening of switch 72 which cuts off air supply to cylinders 73, permitting the platen to rise under pull of the counterbalance connections 83, FIG. 6, without the cassette back.

Switch 180 further initiates two additional time delay relays of successively longer delay periods, shown schematically in FIG. 32. Time delay relay #2 opens circuit to the control valve for cylinders 51 and 68, causing pusher 57 and side gauges 60, 61 to relax their hold on the cassette, opening switch 72. Time delay relay #3 next operates latch 183 releasing the bed 48.

The latch 173 normally permits the bed to drop only to the first stopping point for discharging cassettes onto the reject shelf. If energized by action of the air switch having sensed passage of film this latch retracts permitting the bed to drop further and the cassette to pass on to a sorter as a properly loaded reusable cassette.

As a part of or in conjunction with the magazine selecting operation the reloaded cassettes may be classified and stored or otherwise disposed of according to size of film.

This is accomplished in the machine illustrated by provision of an inclined guide 184, FIGS. 4 and 23, in line with the lower stop 69, positioned to direct a loaded cassette released from the bed 48 onto an aligned inclined sorting frame 185, pivoted on an intermediate axis 186, FIGS. 23 and 24, so that it may swing to the left or to the right, thus to deliver a cassette received thereon into bins or other receivers 187 at the left or receivers for different size cassettes 188 at the right.

Four of such different size cassette receivers 187, 188 are shown in FIG. 24, designed to receive the cassettes for the four different sizes of film supplied by the four magazines.

The sorting action of the reversely rotatable cassette supporting frame 185 is controlled in the illustration by electrically erected stops limiting rotary movement of the sorting frame and which are positioned by the same calipering mechanism which determines the size of cassette being entered in the machine and selection of the magazine which is to supply film for reloading that particular cassette. In the illustration there are four angularly spaced stops 189, FIGS. 24 and 25, at one side of the pivotal axis 186 and four other angularly related stops 190 at the opposite side of this axis, on an index plate or board 191, with solenoids 192, FIGS. 26 and 27 for erecting opposite stops one at each side of the center and solenoids 193 for erecting a pair of opposite stops positioned to limit rotation of the sorting frame in the proper direction and extent of movement to direct cassettes of different sizes into their predetermined bins.

Shaft 186 which carries the sorter 185 is shown in FIG. 23 as pivotally mounted in a supporting sleeve 193' at one end, the lower end in this view, and as received at the opposite end in a vertical slot 194 in the index plate 191.

A spring latch 213 catches and temporarily holds shaft 186 in lowered position while it is tipping to one side or the other, this latch being released by solenoid 214 when the sorting action has been completed.

A spring 195 engaged with shaft 186 exerts tension to hold the sorting frame in the upwardly inclined relation shown in FIG. 23.

On receipt of a cassette against the bottom stop 196 this yieldingly supported sorting frame will lower to a horizontal position so as to properly direct the loaded cassettes into the cassette holders 187, 188 at opposite sides of the sorter axis 186.

In lowering under weight of the cassette the frame will engage the uppermost stop 189 which has been projected so as to be automatically tipped in the right direction and as it reaches the lower horizontal position will contact the companion stop 190 at the opposite side and thus be limited in tilting movement to direct the cassette into the proper bin or holder.

These loaded cassettes classified according to film size may then be removed directly from holders 187 and 188 shown in FIGS. 1 and 24, or if dustproof enclosures are desired, through doorways or openings indicated at 27, FIGS. 24 and 28.

In radiography it is essential for best results that the intensifying screens be held in uniform engagement with the X-ray film.

It is essential in the present invention that the cassettes open readily and be readily and firmly closed.

These purposes are accomplished in the present invention by the provision in the cassettes of flat airbags which will tension the screens against the X-ray film, exert pressure to hold the cassette backs firmly secured and which will yield under pressure of the platen to permit free locking and unlocking operation of the slides for securing the cassette backs.

FIGS. 17 through 22 illustrate these features.

Figure 22:
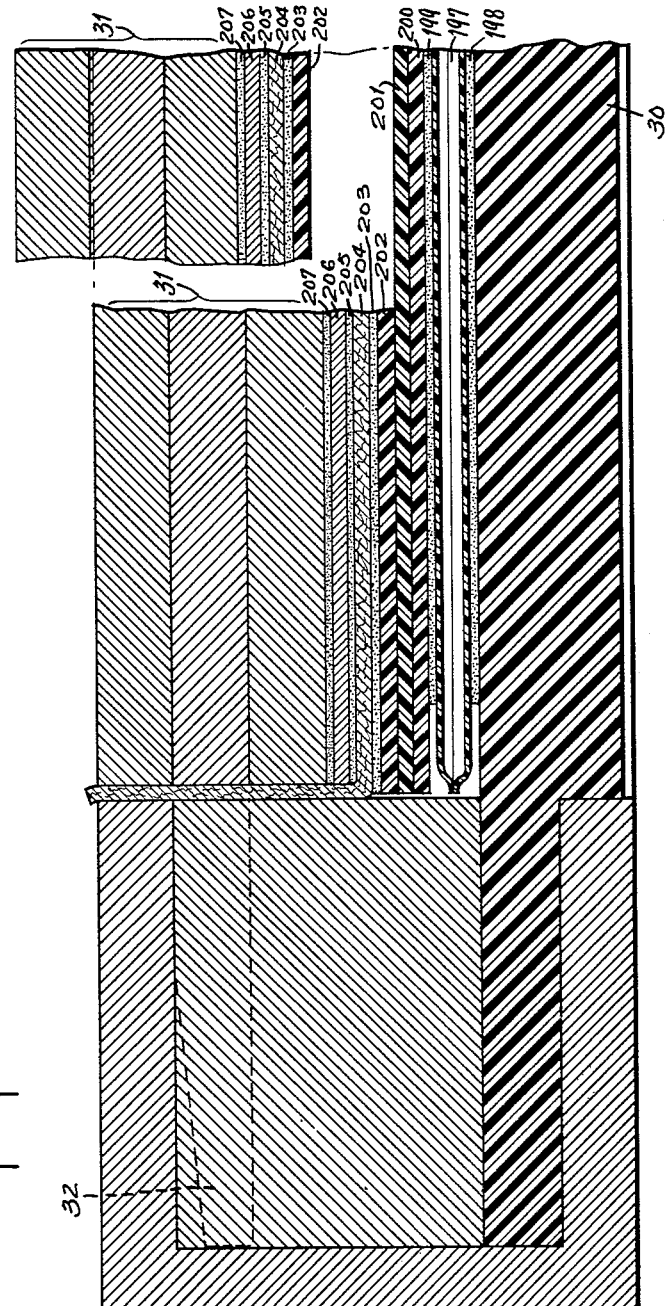
FIG. 22 is a broken enlarged sectional detail illustrating structure of the cassette and the air bag therein for maintaining uniform pressure of the intensifying screens on the film.

In the greatly enlarged sectional view, FIG. 22, the airbag mentioned above is shown at 197 secured by a thin layer of adhesive 198 on the back of the radioparent front 30 of the cassette and by adhesive 199 to the front intensifying screen 200.

The X-ray film is indicated at 201 in contact with screen 200 at the front and in contact with the intensifying screen 202 at the back.

The latter screen 202 is shown connected by adhesive 203 with the layer of felt 204 and this layer as adhesively secured at 205 with the layer of lead 206 which is adhesively secured at 207 to the cassette back 31.

The broken section in the upper right hand corner of this view, FIG. 22, shows how the back 31 carries with it the upper layers of material, including the back screen 202, leaving the X-ray film 201 free to be removed and the front screen 200 and the airbag beneath the same attached to and remaining in the cassette when the back and the X-ray film are removed.

The airbag may be made up of two layers of attached flexible plastic film, extending substantially the full expanse of the cassette interior and containing air or other gaseous medium under moderate pressure, sufficient to hold the screens firmly engaged with the X-ray film and the back firmly held by the securing slides 32.

The plastic film for the airbag is selected to be impermeable and for manufacturing purposes should be heat sealable so that the two layers may be readily connected about the edges.

A plastic film suitable for the purpose has a polyethylene inner surface which is thermoplastic and heat sealable but not completely impenetrable to gas and a polyester outer surface which, while not heat sealable, is impervious to gas. These two layers may be heat sealed together about the edges to provide the impervious bag desired.

The moderate pressure indicated is attained and maintained only when the cassette is closed and locked. With the cassette opened the bag is at room pressure. The pressure exerted in the closing operation provides a sufficient pressure evenly distributed over the inner surfaces and maintained by the mechanical lock holding the back in place.

The runners 82, FIG. 15, on the bottom of the platen apply pressure on the back in the lowering movement of the platen which may cause the airbag to yield somewhat, thus to take part of the load off the locking slides and permit easier and freer movement of the slides in unlocking the back from the cassette.

The ends of the slides 32 which enter the keeper slots in the cassette frame may be inclined to enter the slots the more readily and to apply a wedging force for holding the back securely in place. The platen in applying pressure to the cassette back may take some of this load off the slides, permitting smooth, easy retracting movement of the same.

To facilitate preliminary handling of the airbags and the mounting of them in place in the cassette, these bags are shown in FIGS. 30, 31 as made up with adhesive 198 and 199 on opposite faces of the same covered by sheets 208 of material which can be readily peeled from the bag, leaving the adhesive faces of the same to be secured in the cassette and to the front screen in the relation shown in FIG. 22.

Thus no screen mounting adhesive is required, the adhesive coated bags serving both for pressure applying purposes and for screen mounting. This combination avoids the usual undesirable ridge at the point of conventional screen mounting and the attendant lack of uniform contact with encased photographic film elsewhere in the screen area.

The operating and control parts of the machine illustrated, such as air cylinders, magnet valves, solenoids, time delay relays, microswitches and the like, are relatively simple, inexpensive and readily available, enabling such machines to be built at reasonable cost. The mercury switch for releasing the magnetic latch normally holding the entry door closed may be an ordinary tilting mercury switch modified by carrying a small permanent magnet to be attracted to the paramagnetic plug in the back of the cassette, thus to momentarily overbalance it to the circuit closing latch releasing position.

These pairs are all readily mounted, connected, combined, adjusted and timed to effect the necessary correlation, interlocking and sequence of operations for unlocking, reloading and classifying the cassettes.

Completion of the cycle of operations is or may be signalized by the action of a switch 209, FIGS. 4 and 23. This switch, as shown in these views, is actuated by passage of a loaded cassette to the sorter, via trap door 215 to energize cylinder 210 for returning the cassette bed 48 to horizontal position, supported by latch 183 and for neutralizing other parts.

A similar spring closed exit door is shown at 216, FIGS. 4 and 23, for rejected cassettes.

Restoring the bed to the final horizontal position, shown in FIGS. 4 and 23, operates a switch 217 which deenergizes the bed lifting cylinder 210 and completes the cycle.

The various switches and other control parts are connected to effect the sequence of operations described and preferably in "fail safe" order such, for example, that the machine will not admit a cassette if there is a cassette still in the machine or if any one of the magazines is open.

Various signals and indicators may be connected to indicate operation or any failure in operation of the machine or to show progress of operations or stoppage or cause of stoppage at any stage in the operations. Warning signals such as for showing depletion of film supplies may be provided, the latter by travel of the elevator required to engage a stack of film with the film removing cups. This travel of the elevator is in effect a measure of the film remaining in a magazine and hence may be utilized to show as by way of a warning light that the pile of film in such magazine is becoming depleted.

FIG. 32 is a wiring diagram in simplified form, which will be understood from the preceding description and from the following list of parts and annotation of the diagram.

In this diagram the magnet valves, which are governed by the switches and which control operation of the air cylinders, are shown directly associated with the cylinders but it will be understood that they may be located where most practical for accomplishment of desired results.

*List of Electrical Parts on FIG. 32*

39—Trap door latch
40—Trap door mercury switch
42—Trap door switch starts motor
43—Motor drive for cassettes
50—Arrival switch
51—Pusher cylinder
59—Size selector switches
68—Side gages centering cylinder
72—Switch end of pusher cylinder
73—Platen cylinders, rise and fall
86—Unlock solenoid
87—Lock solenoid
91—Contact switch platen to cassette
97—Let-go solenoid
98—Grasp solenoid
100—Let-go solenoid
101—Grasp solenoid
103—Switch on platen, controls rise
104—Switch on platen, controls rise
107—Switch platen up
125—Film drive motor
126—Pick-up cylinders
152—Magazine cylinders
155—Air jet, film separator
160—Elevator cylinder
170—Air jet, film passage detector
172—Switch, reject latch
173—Reject latch
176—Vacuum pump
178—Low pressure switch
180—Pick-up arm return
181—Vacuum dump valve
182—Platen bottoming switch
183—Bed latch
192—Sorter solenoid
193—Sorter solenoid
209—Exit door switch
210—Bed raise cylinder
214—Sorter latch
217—Switch on bed, indicating restored position
218—Elevator cylinder switch
220—Vacuum valves actuated by switch 59
TD #1—Lowers platen
TD #2—Releases cassette end and side clamps
TD #3—Lowers bed

*Annotation of Simplified Wiring Diagram FIGURE 32*

(1) Mercury switch 40 energizes latch 39, permitting trap door to open.

(2) Opening door closes switch 42 starting motor 43.

(3) Cassette arrival switch 50 energizes cylinders 51 and 68, side and end clamps on cassette, via closed contacts of TD #2.

(4) Linkage moved by 51 is arrested at end of cassette, closing one of several contacts on selector switch 59, operating cylinder 152 for corresponding magazine and related vacuum valve 220 and sorter solenoid 192.

(5) Continued pressure on cylinder 51 closes switch 72.

(6) Switches 103 and 104, in closed condition as a result of last previous use of machine, complete circuit to cylinders 73, forcing platen down.

(7) Contact of platen with cassette back closes switch 91 and arrival of platen at bottom reverses switch 182, energizing 86, 98 and 101 while deenergizing 87, 97 and 100. This unlocks the back and grasps it. It also permits 103 and 104 to open, deenergizing cylinders 73, permitting the platen to rise carrying the back of the cassette with it.

(8) On rising, platen closes switch 107 energizing cylinder 126 which rocks the pick-up arms, the film drive motor 125, the vacuum pump 176 and air jets 155 and 170.

(9) On rocking to pick-up position, linkage 130 closes switch 218, energizing the elevator cylinder 160.

(10) When vacuum seals, switch 178 opens, deenergizing cylinder 126, permitting pick-up mechanism to rock to return position.

(11) Return of pick-up causes bar 130 to close switch 180 which opens large orifice valve 181, and start Time Delays 1, 2 and 3.

(12) Delivery of film to chute permits it to fall, operating sensitive switch 172, operating latch 173 permitting cassette to pass if loaded.

(13) Lapse of TD #1 now shunts switches 103 and 104, restoring air to cylinders 73, forcing platen down again.

(14) On bottoming, platen reverses switch 182, deenergizing the "unlock-and-grasp" solenoids and energizes the "lock-and-let-go" solenoids.

(15) Time delay #2 presently deenergizes 51 and 68, the side and end clamps, relaxing pressure on switch 72.

(16) Switch 72 opens, deenergizing cylinders 73, permitting platen to rise without cassette back.

(17) Time delay #3 operates bed-latch, permitting switch 217 to close.

(18) Cassette rolls off through exit trap door, closing switch 209.

(19) Switches 209 217, both being closed, energize cylinder 210, raising bed, and solenoid 214, restoring sorter.

(20) On raising to latched horizontal position, bed opens switch 217 opening circuit to cylinder 210 and latch 214.

The invention, it will be seen completes the full automation of X-ray film processing by eliminating the usual manual steps. By such savings in time reading can be accomplished within eight minutes or less after actual exposure of film.

Appreciable savings in time, labor, space and expense are all effected.

Fogging of film, double exposures and artefacts on film or screen from manual handling are all avoided since the film need not be touched by hand from manufacturer to reader.

Screen and cassette life are prolonged and stains, scratches, dust and finger prints are avoided.

Delayed storage of cassettes in pass-box and delays in reloading are avoided.

With greater efficiency afforded by the invention fewer cassettes are necessary and investment costs are thereby reduced.

Ready loaded spare magazines can be inserted in the machine in seconds, eliminating dark room delay in opening of film packages.

The entire operation of the machine may be carried on in daylight, with no waiting of expensive personnel for "lights out" periods.

The arrangement of X-rays departments can be made more compact and readily accessible for all the processing operations, cassette storage and the like.

The airbags for uniformly holding the intensifying screens on the X-ray film and for holding the floating front screen in place while the X-ray film is being removed, may be sold and used to advantage as a commercial product, separate from the automatic loading machine, for use in cassettes of other manufacture.

While the invention is particularly concerned with the automatic unloading and reloading of cassettes used in radiography, it will be appreciated that the invention may be applied to other uses involving the problem of opening a container, removing contents and then reloading the container with similar contents and restoring the container to its original closed condition.

What is claimed is:

1. In a cassette loading machine the combination of
    cassettes having backs openable for removal of exposed film and replacement of fresh film and retaining means for normally keeping said backs closed, and
    means for effecting the release of said retaining means and for holding the backs in open position while replacing exposed film with fresh film,
    said cassettes being of different sizes,
    means for centering the different size cassettes in the same relative position in the machine, and
    said means for effecting release and holding the backs in open position being positioned for cooperation with the cassettes in said centered position in the machine.

2. Cassette loading apparatus comprising the combination of
    cassettes having backs provided with keyhole openings,
    bolts slidable in said backs for securing the backs in place in the cassettes,
    pinions rotatably mounted in said backs,
    said bolts having racks engaged with said pinions whereby rotation of said pinions will effect release or securing of the backs in the cassettes,
    a platen mounted for movement toward and away from the cassettes,
    back lifting keys shiftably mounted on said platen in position for entry in said keyhole openings in the backs,
    a spindle rotatably mounted on said platen in position for operating engagement with said pinions,
    means on said platen for shifting said keys when entered in said keyhole openings into and out of lifting engagement with the backs,
    means on the platen for turning said spindle to effect release and back securing movement of said slide bolts,
    said cassettes being of different sizes,
    means for centering the different size cassettes in one particular relation with respect to said platen, and
    said keyhole openings and pinions on the cassettes being in the same relative positions on the cassettes of different sizes so that cassettes of different sizes will all register in proper operative relation with respect to said platen.

3. In a machine for loading cassettes of different sizes, the combination of
    a front stop for cassettes of all sizes,
    cassette feed mechanism for feeding the cassettes of different sizes up to said front stop,
    movable side gages for centering the cassettes of different size on a common center line against said front stop and a fixed side gage disposed to locate all the various size cassettes in position for cooperative engagement by said movable side gages and cassette feed mechanism.

4. A cassette loading machine comprising
    a cabinet having a trap door for admission of cassettes,
    cassette loading means within said cabinet and cooperable with a cassette entered by way of said trap door,
    means for holding said trap door normally closed,
    means on the cassettes, effective to release said holding means when said cassettes are properly positioned for entry by way of said trap door, and
    a fixed gage adjoining said trap door for so positioning cassettes being entered in the machine.

5. A cassette loading machine comprising
    a cabinet having a trap door for admission of cassettes,
    cassette loading means within said cabinet and cooperable with a cassette entered by way of said trap door,
    means for holding said trap door normally closed,
    means on the cassettes, effective to release said holding means when said cassettes are properly positioned for entry by way of said trap door, and
    a fixed gage adjoining said trap door for so positioning cassettes being entered in the machine,
    said means on the cassettes being magnetic elements fixed in definite relation on the cassettes, and
    the means for holding the trap door normally closed including complementary electromagnetic mechanism positioned to be magnetically effected by said magnetic elements on the cassettes.

6. A machine for removing exposed film from "used" cassettes, delivering the extracted film to a "processer" or other receiver and for loading the emptied cassettes with fresh film of the same size and delivering the reloaded cassettes to a holder or repository for ready-to-be-used cassettes, comprising
    a light excluding enclosure having an entrance for cassettes containing exposed film,
    means in said enclosure, in line with said entrance for opening and closing a cassette,
    means for presenting an entered loaded cassette containing exposed film to said opening and closing means
    means actuated by an entered cassette for activating said cassette opening and closing means when a cassette is presented to said opening and closing means,
    a receiver for exposed film,
    film removing means adjoining said cassette opening and closing means for removing exposed film from a cassette opened by said cassette opening and closing means and for effecting delivery of exposed film removed from an opened cassette to said receiver for exposed film,
    a holder in said enclosure for fresh film of the same size as that in the opened cassette,
    means for transferring fresh film from said holder to an opened cassette emptied of exposed film by said film removing means before said cassette is closed by said opening and closing means,
    means for discharging said reloaded and closed cassette from said opening and closing means ready for reuse and common drive connections for effecting operation of said devices in coordinated relation in the order described said means for transferring fresh film to an opened cassette including magazines for holding film of different sizes and means triggered by a cassette entering the machine for effecting selection by said fresh film transferring means of the magazine containing film of the same size as that removed from said cassette.

7. In a cassette unloading and reloading machine, the combination of means for unloading cassettes containing different size exposed film, magazines of different size film such as contained in said cassettes, means for effecting selection of film of corresponding size from said magazines and for inserting the same in cassettes of the corresponding film size, means for sorting the cassettes loaded with said corresponding size film in accordance with film size and drive connections for effecting operation of the foregoing means in the relation and order described.

8. A machine for removing exposed film from "used" cassettes, delivering the extracted film to a "processor" or other receiver and for loading the emptied cassettes with fresh film of the same size and delivering the reloaded cassettes to a holder or repository for ready-to-be-used cassettes, comprising a light excluding enclosure having an entrance for cassettes containing exposed film, means in said enclosure, in line with said entrance for opening and closing a cassette, means for activating said cassette opening and closing means when a cassette is presented to said opening and closing means, a receiver for exposed film, film removing means adjoining said cassette opening and closing means for removing exposed film from a cassette opened by said cassette opening and closing means and for effecting delivery of exposed film removed from an opened cassette to said receiver for exposed film, a holder in said enclosure for fresh film of the same size as that in the opened cassette, means for transferring fresh film from said holder to an opened cassette emptied of exposed film by said film removing means before said cassette is closed by said opening and closing means, means for discharging said reloaded and closed cassette from said opening and closing means ready for reuse, common drive connections for effecting operation of said devices in coordinated relation in the order described, said means for transferring fresh film including a rack of magazines having trays for holding different size film, elevator mechanism for raising and lowering said rack of magazines, film pickup devices positioned in line with said trays and means triggered by a cassette entered in the machine for projecting the tray carrying film of the same size as that in the entered cassette into register with the pickup device in line with said tray.

9. The invention according to claim 8 with means controlling said elevator mechanism to lift the tray which has been projected to engage the film thereon with the pickup device aligned therewith.

10. A machine for removing exposed film from "used" cassettes, delivering the extracted film to a "processor" or other receiver and for loading the emptied cassettes with fresh film of the same size and delivering the reloaded cassettes to a holder or repository for ready-to-be-used cassettes, comprising a light excluding enclosure having an entrance for cassettes containing exposed film, means in said enclosure, in line with said entrance for opening and closing a cassette, means for activating said cassette opening and closing means when a cassette is presented to said opening and closing means, a receiver for exposed film, film removing means adjoining said cassette opening and closing means for removing exposed film from a cassette opened by said cassette opening and closing means and for effecting delivery of exposed film removed from an opened cassette to said receiver for exposed film, a holder in said enclosure for fresh film of the same size as that in the opened cassette, means for transferring fresh film from said holder to an opened cassette emptied of exposed film by said film removing means before said cassette is closed by said opening and closing means, means for discharging said reloaded and closed cassette from said opening and closing means ready for reuse, common drive connections for effecting operation of said devices in coordinated relation in the order described, means for feeding and centering cassettes of different film sizes to the same definitely centered position in the machine irrespective of difference in cassette sizes, said means for opening and closing a cassette including a spindle engageable with a cassette and said cassettes for different size film each having a part engageable by said spindle in said centered position of the cassettes.

11. A machine for removing exposed film from "used" cassettes, delivering the extracted film to a "processor" or other receiver and for loading the emptied cassettes with fresh film of the same size and delivering the reloaded cassettes to a holder or repository for ready-to-be-used cassettes, comprising a light excluding enclosure having an entrance for cassettes containing exposed film, means in said enclosure, in line with said entrance for opening and closing a cassette, means for activating said cassette opening and closing means when a cassette is presented to said opening and closing means, a receiver for exposed film, film removing means adjoining said cassette opening and closing means for removing exposed film from a cassette opened by said cassette opening and closing means and for effecting delivery of exposed film removed from an opened cassette to said receiver for exposed film, a holder in said enclosure for fresh film of the same size as that in the opened cassette, means for transferring fresh film from said holder to an opened cassette emptied of exposed film by said film removing means before said cassette is closed by said opening and closing means, means for discharging said reloaded and closed cassette from said opening and closing means ready for reuse, common drive connections for effecting operation of said devices in coordinated relation in the order described, said light excluding enclosure having a trap door openable to admit a cassette and means for opening said tray door, and said cassettes each having means cooperable with said door opening means to effect actuation of the latter on proper presentation of a cassette to enter the machine.

12. In a machine for loading cassettes of different sizes, the combination of a front stop for cassettes of all sizes, cassette feed mechanism for feeding the cassettes of different sizes up to said front stop, movable side gages for centering the cassettes of different size on a common center line against said front stop, means for supplying different size film for cassettes of different film size and connections from said cassette feed mechanism for effecting selective operation of said means for supplying different size film.

13. A machine for opening, removing exposed film from "used" cassettes, delivering the extracted film to a "processer" or other receiver, loading the emptied cassettes with a fresh film of the same size and then closing and delivering the reloaded cassettes to a location, ready for use again, comprising a light excluding enclosure having an entrance for cassettes containing exposed film, means in said enclosure in line with said entrance for opening and closing a cassette, means for presenting an entered cassette of exposed film to said opening and closing means, means actuated by an entered cassette for energizing said cassette opening and closing means on presentation of a cassette to said opening and closing means, a holder for fresh film of the same size as that in an opened cassette, a receiver for exposed film, film removing means for removing exposed film from a cassette opened by said cassette opening and closing means and for passing exposed film removed from an opened cassette to said receiver for exposed film, means for transferring fresh film from said holder into an opened cassette emptied of exposed film by said film removing means prior to closure of the cassette by said opening and closing means, common drive connections for timing said fresh film transfer means to load fresh film into an opened cassette after removal of the exposed film and before closure of the cassette by said cassette opening and closing means, means for effecting discharge of the reloaded and closed cassette from said cassette opening and closing means, ready for re-use and other drive connections coordinated with said first mentioned common drive connections for effecting operation of said related devices in the order described.

14. The invention according to claim 13 in which said means for transferring fresh film includes a detector for film, connected to control operation of said means for effecting discharge of reloaded and closed cassettes according to presence or absence of film in said cassettes.

15. The invention according to claim 13 in which said holder for fresh film is located above said means for opening and closing a cassette and in which the cassettes in the machine are disposed with the openable backs of the same faced upwardly, the means for opening and closing cassettes is arranged to lift said backs and the means for transferring fresh film is arranged to pass the fresh film downwardly from the holder into an opened cassette beneath the up-lifted back of the same.

16. The invention according to claim 13 in which said holder is arranged to hold film of different sizes, said means for transferring fresh film is arranged to select sizes of film according to the cassette presented to said opening and closing means and means are provided for sorting the loaded cassettes according to film size loaded therein.

17. The invention according to claim 13, with means for detecting faults in the flow of film handling operations described, which would cause faults in the subsequent loading of cassettes and cassette directing means under control of said means for detecting faults, for directing cassettes detected to be faulty away from cassettes properly loaded in the normal operation of the machine.

References Cited in the file of this patent

UNITED STATES PATENTS

| 1,449,970 | Bucky | Mar. 27, 1923 |
| 3,075,080 | Sano | Jan. 22, 1963 |
| 3,105,903 | Sano et al. | Oct. 1, 1963 |
| 3,111,585 | Sano et al. | Nov. 19, 1963 |

FOREIGN PATENTS

| 236.164 | Great Britain | July 30, 1925 |